(12) United States Patent
Sabbagh

(10) Patent No.: US 12,082,540 B2
(45) Date of Patent: Sep. 10, 2024

(54) PLANT CULTIVATION APPARATUS AND METHOD

(71) Applicant: Ayad Sabbagh, Nepean (CA)

(72) Inventor: Ayad Sabbagh, Nepean (CA)

( * ) Notice: Subject to any disclaimer, the term of this patent is extended or adjusted under 35 U.S.C. 154(b) by 0 days.

(21) Appl. No.: 17/708,515

(22) Filed: Mar. 30, 2022

(65) Prior Publication Data

US 2022/0312703 A1 Oct. 6, 2022

Related U.S. Application Data

(60) Provisional application No. 63/167,992, filed on Mar. 30, 2021.

(51) Int. Cl.
*A01G 31/06* (2006.01)
*A01G 9/029* (2018.01)
*A01G 9/24* (2006.01)

(52) U.S. Cl.
CPC .......... *A01G 31/06* (2013.01); *A01G 9/0297* (2018.02); *A01G 9/247* (2013.01)

(58) Field of Classification Search
CPC .......... A01G 31/06; A01G 9/24; A01G 9/249; A01G 7/045; A01G 9/022; A01G 9/023
See application file for complete search history.

(56) References Cited

U.S. PATENT DOCUMENTS

| | | | | |
|---|---|---|---|---|
| 4,756,120 A * | 7/1988 | Arledge | ................ | A01G 31/06 47/59 R |
| 8,234,815 B2 * | 8/2012 | Felknor | ................ | A01G 9/023 47/82 |
| 8,776,433 B2 * | 7/2014 | Huang | ................ | A01G 31/06 47/82 |
| 9,521,811 B2 * | 12/2016 | Peterson | ............. | A01G 27/005 |
| 10,660,283 B2 * | 5/2020 | Tidona | ................ | A01G 31/06 |
| 10,842,082 B1 * | 11/2020 | Genga, Jr. | ............. | A01G 9/249 |
| 10,888,055 B2 | 1/2021 | Bryan | | |
| 11,006,582 B2 * | 5/2021 | Arroyo | ................ | A01G 9/027 |
| 11,304,377 B2 * | 4/2022 | Stevens | ................ | A01G 9/023 |
| 2020/0037526 A1 | 2/2020 | Sperry | | |

(Continued)

FOREIGN PATENT DOCUMENTS

| | | | | |
|---|---|---|---|---|
| CA | 3144729 A1 * | 2/2021 | ......... | A01G 13/105 |
| CN | 109601364 A * | 4/2019 | ............ | A01G 31/06 |

(Continued)

*Primary Examiner* — Joshua D Huson
*Assistant Examiner* — Katherine Anne Kloecker

(57) ABSTRACT

A plant cultivation apparatus and system including a reservoir and central shaft containing a first and second end, wherein the first end of the central shaft terminates in the central chamber of the reservoir. One or more trays are positioned along the central shaft with variable distances between each tray. The plant cultivation apparatus and system also includes an outer housing member having a plurality of plant-receiving apertures. The outer housing member defines a chamber and has a bottom edge. The bottom edge defines a respective opening, which is configured to contact a reservoir opening. The hydroponic apparatus and system may further include a lighting system mounted above the outer housing member, the lighting system illuminating plants inserted into the plant-receiving apertures to enable the associated plants to photosynthesize in environments exposed to low levels of sunlight.

16 Claims, 16 Drawing Sheets

(56) References Cited

U.S. PATENT DOCUMENTS

2020/0236864 A1* 7/2020 Henry ................. A01G 27/003
2021/0176932 A1* 6/2021 Atwal ................... A01G 31/02

FOREIGN PATENT DOCUMENTS

| CN | 111387039 A | | 7/2020 |
|---|---|---|---|
| KR | 20120094404 A | * | 8/2012 |
| KR | 20160047694 A | * | 5/2016 |
| KR | 102066276 B1 | | 1/2020 |

* cited by examiner

PLANT CULTIVATION APPARATUS AND METHOD

CROSS REFERENCE TO RELATED APPLICATION(S)

This application claims priority to and the benefit of U.S. Provisional Application No. 63/167,992, filed Mar. 30, 2021, which is incorporated herein by reference in its entirety.

TECHNICAL FIELD

The present disclosure relates to hydroponic devices for plant cultivation. More particularly, the present disclosure relates to hydroponic devices with water and/or nutrient circulation systems.

BACKGROUND

Various hydroponic devices and systems have been proposed that recirculate water and/or nutrient solution through one or more plant units. The need for systems that can maintain optimal conditions to facilitate plant growth is still not completely met. Additionally, conventional hydroponic systems are restrictive in their portability and lack aesthetically pleasing features. It would thus be desirable to provide a hydroponic device and system that can maximize the number of plants that can be grown in a given hydroponic system while maintaining optimal conditions to facilitate the growth of such plants. Furthermore, it would be desirable that such a device and system be movable between indoor and outdoor environments and have aesthetically pleasing features.

SUMMARY

Disclosed herein is a plant cultivation apparatus that includes a reservoir, a central shaft, a plurality of trays, and an outer housing member. The reservoir is configured to contain a fluid and has a reservoir opening defined by a reservoir edge, and the reservoir opening defines a central chamber. The central shaft has a first end that terminates in the central chamber of the reservoir, a second end, and a length. The plurality of trays is positioned in a spaced relationship along the length of the central shaft, and project radially outward from the central shaft. The outer housing member has a housing member wall and a contact edge connected to the housing member wall. The contact edge also defines a contact edge opening. Further, the contact edge is configured to matingly contact the reservoir edge, and the housing member defines a chamber configured to receive the plurality of trays and the central shaft. Finally, the housing member wall has at least one plant-receiving aperture defined in the housing member wall, wherein the plant-receiving aperture is configured to receive and retain a bare-root plant or a seed starting member.

Also disclosed is a method for hydroponically growing plants, the method including a step of inserting at least one plant root structure into a plant-receiving aperture that is defined in a plant cultivation apparatus. Another step includes intermittently pumping plant nutrient solution from a reservoir to a first tray that includes a plurality of drain apertures that are positioned proximate to, and substantially above, the plant root structure. Another step includes cascading the plant nutrient solution onto at least one plant root structure, wherein the cascading includes the plant nutrient solution traveling through the drain apertures and onto a second tray positioned below the first tray. Another step includes reintroducing the plant nutrient solution to the reservoir.

BRIEF DESCRIPTION OF THE DRAWINGS

The various features, advantages and other uses of the present apparatus and method will become more apparent by referring to the following detailed description and drawing in which.

DETAILED DESCRIPTION

Disclosed is a plant cultivation apparatus 100 and method 500 of which one or more plants 414 can be grown in a soil free environment, such that plants 414 are fed an intermittent stream of water and/or plant nutrient solution to facilitate growth of the one or more plants 414. It is contemplated by this disclosure that there exists a need by both recreational and commercial plant growers for an aesthetically pleasing plant cultivation apparatus that may facilitate the cultivation of a plurality of plants and that may be used in both indoor and outdoor environments.

Figure 1:
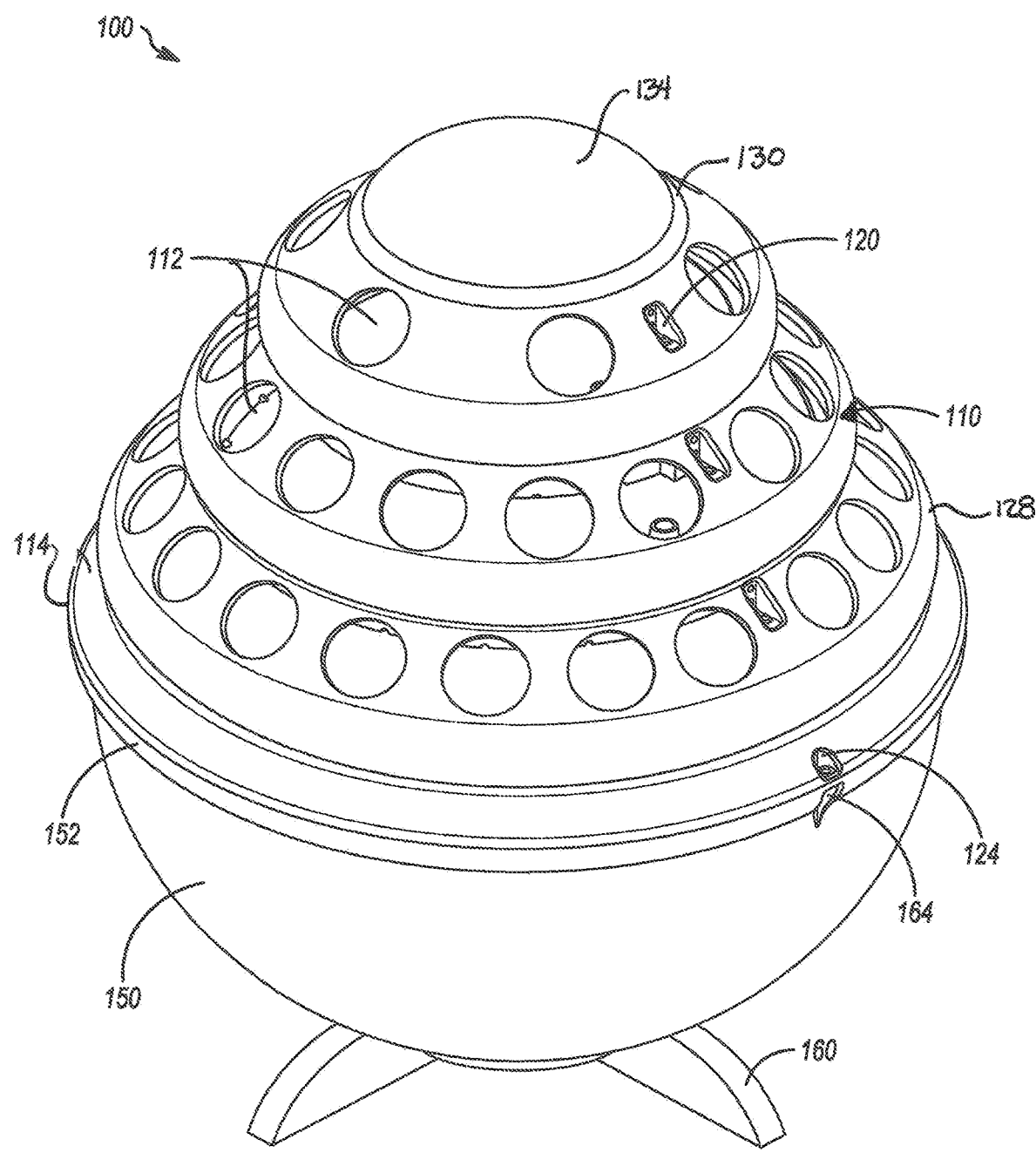
FIG. 1 is an upper perspective view of an embodiment of the plant cultivation apparatus as disclosed herein.
Figure 2:
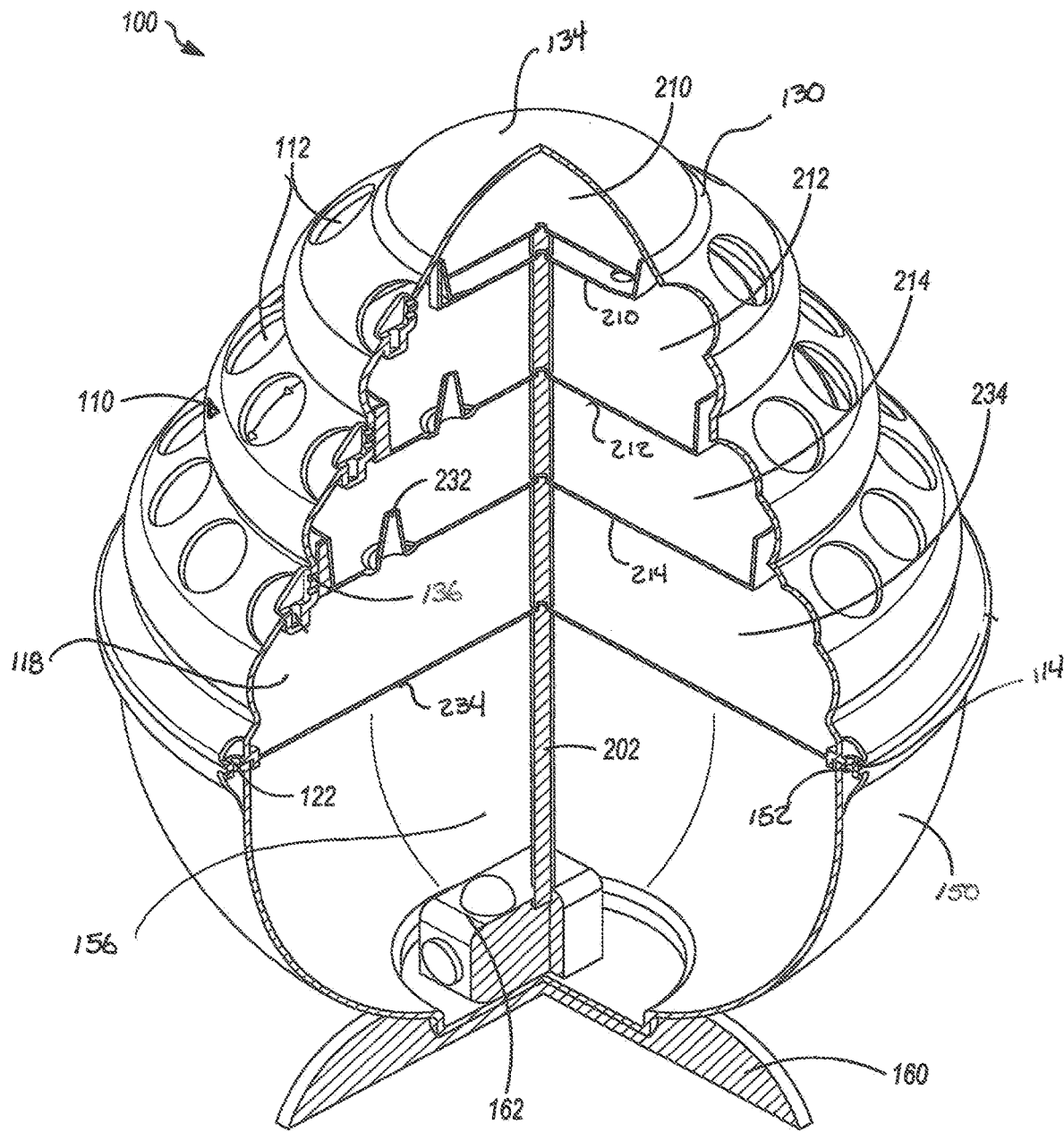
FIG. 2 is an upper perspective, cutaway view of the plant cultivation apparatus of FIG. 1.

Referring to FIGS. 1 and 2, in select embodiments the plant cultivation apparatus 100 may include an outer housing member 110 that defines a chamber 118, a reservoir 150 that defines a central chamber 156 and that is operable to contain a fluid 424 therein, and internal components 200. In such embodiments, the outer housing member 110 may be configured to matingly contact the reservoir 150 such that the chamber 118 of outer housing member 110 and the central chamber 156 of the reservoir 150 cooperatively contain the internal components 200.

The internal components 200 may be configured to circulate the fluid 424 within the chamber 118 and the central chamber 156, such that the fluid 424 may cascade over one or more plant pod assemblies 402, whereby the fluid 424 is captured in the reservoir 150 and recirculated. Such fluid 424 may, for example, be a plant nutrient solution. As another example, the fluid 424 may be water.

In certain embodiments, the outer housing member 110 and the reservoir 150 may include external geometries that cooperatively form an aesthetically pleasing exterior appearance of the plant cultivation apparatus 100. For example, the outer housing member 110 may include an external geometry that resembles a portion of a prolate spheroid, and the reservoir 150 may include an external geometry that resembles a portion of a spherical ellipsoid, such that when matingly contacting the outer housing member 110 and reservoir 150 cooperatively resemble an egg shape.

In other embodiments, the outer housing member 110 and the reservoir 150 may have other external geometries. For example, as shown in FIG. 1, the outer housing member 110 may have an external geometry that includes a plurality of curves and ridges to resemble a step-like structure. Other external geometries of the outer housing member 110 and the reservoir 150 suitable for plant cultivation are also contemplated by this disclosure such as, for example, pyramidal geometries, cylindrical geometries, ellipsoidal geometries, cubic geometries, or various combinations thereof.

The outer housing member 110 and the reservoir 150 may be formed from any suitable material that is resistant to moisture and ultraviolet radiation, such that the plant cultivation apparatus 100 may be positioned in indoor or outdoor environments without substantially degrading due to precipitation, humidity, and/or sunlight exposure. For example, the outer housing member 110 and the reservoir 150 may be formed from plastics such as polycarbonate, high density polyethylene, or the like. As another example, the outer housing member 110 and the reservoir 150 may be formed from ceramic materials.

It is contemplated by this disclosure that the plant cultivation apparatus 100 may be used for demonstrative purposes, for example, to educate students about the operation of hydroponic devices. When used for such purposes, it may be desirable that the outer housing member 110 and/or the reservoir 150 be substantially transparent, such that the internal components 200 may be viewable from the exterior of the plant cultivation apparatus 100. In such embodiments, the outer housing member 110 and/or the reservoir 150 may be formed from a suitable transparent material such as, for example, acrylic or glass.

The reservoir 150 may be configured such that the central chamber 156 has a suitable volume to accommodate the irrigation of the plants 414. In select embodiments, the volume of the central chamber 156 may, for example, be between 10 and 50 gallons. The reservoir 150 may also be configured with a flat bottom for stability and to accommodate a pump 162.

Figure 9:
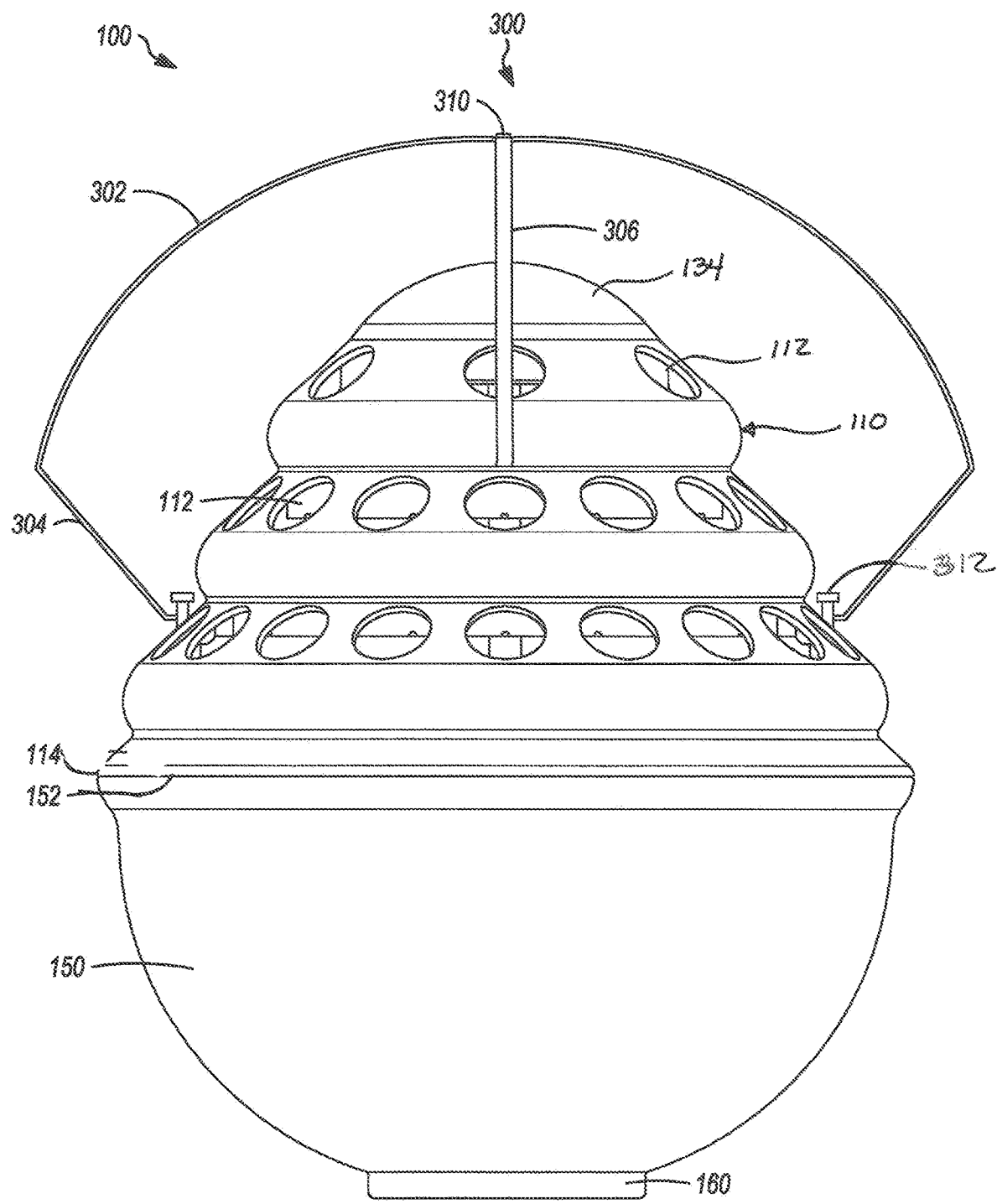
FIG. 9 is a side elevation view of the plant cultivation apparatus of FIG. 8.
Figure 10:
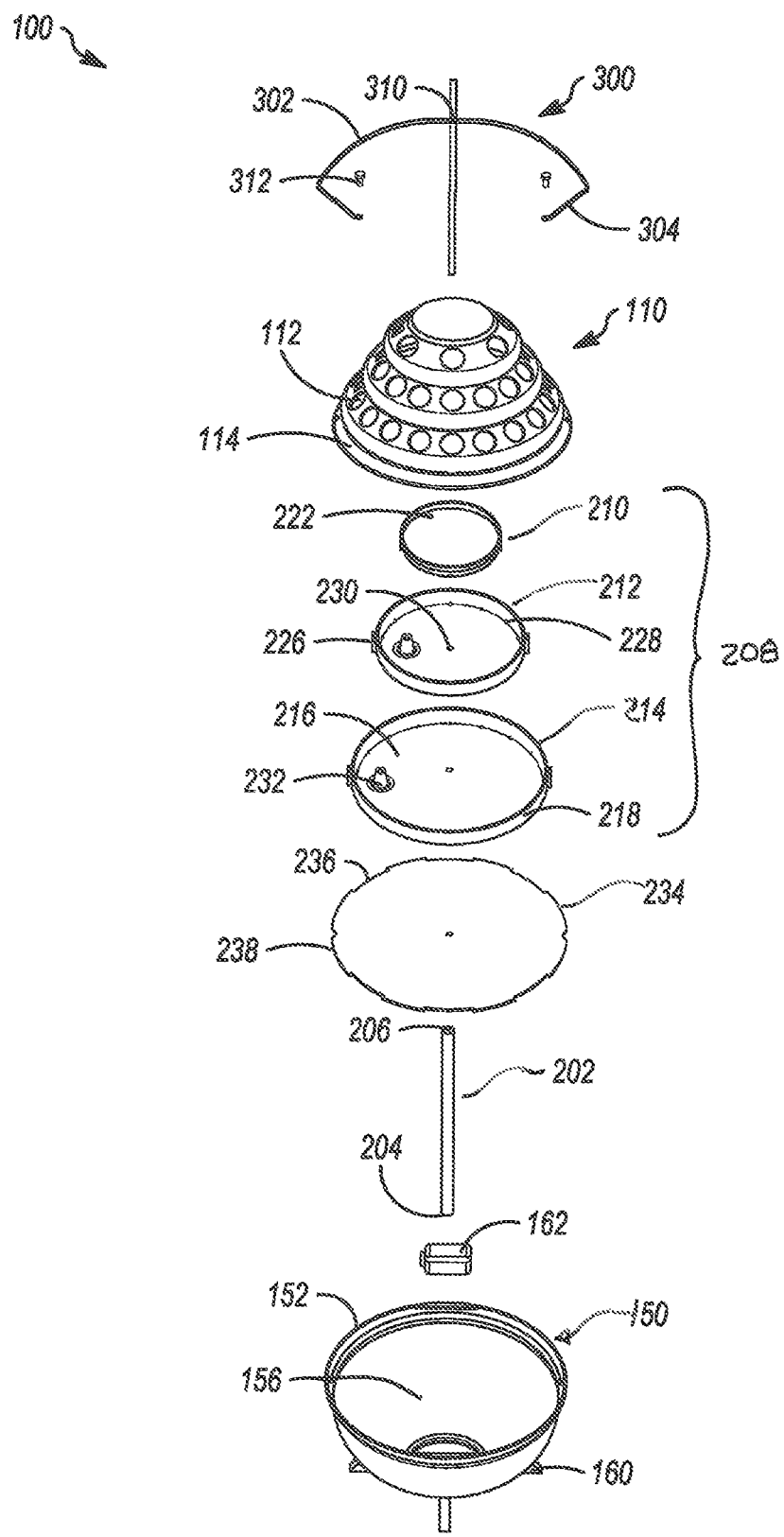
FIG. 10 is an upper perspective, exploded view of the plant cultivation apparatus of FIG. 8.

In certain embodiments, the reservoir 150 may include a base 160 connected to a bottom area of the reservoir 150 that may cause the plant cultivation apparatus 100 to remain in an upright orientation without additional support. The base 160 may be any suitable geometry to support the plant cultivation apparatus 100 in an upright orientation. For example, as best shown in FIG. 9, the base 160 may be a flat, bottom portion of the reservoir 150. As another example, as shown in FIG. 1, the base 160 may comprise two substantially flat members oriented in an X shape and having a recessed portion to receive a flat, bottom portion of the reservoir 150.

In select embodiments, the outer housing member 110 may comprise an outer housing member wall 128, a contact edge 114 connected to the outer housing member wall 128, and a contact edge opening 116 defined by the contact edge 114. In such embodiments, the reservoir 150 may include a reservoir edge 152 and a reservoir opening 154 defined by the reservoir edge 152. The reservoir edge 152 may matingly connect to the contact edge 114 of the outer housing member 110, such that the contact edge opening 116 is positioned adjacent to the reservoir opening 154.

In some embodiments, the outer housing member 110 may include one or more accessory apertures 120 configured to secure one or more accessories 400 to the outer housing member 110. The one or more accessory apertures may be positioned in a spaced relationship on the outer housing member 110. The one or more accessory apertures 120 may be configured to receive one or more threaded inserts 122 to facilitate the attachment of accessories that include threaded portions. Examples of accessories may include, for example, a lighting system 300 and stakes that support a plant such as plant 414 during cultivation.

Figure 3:
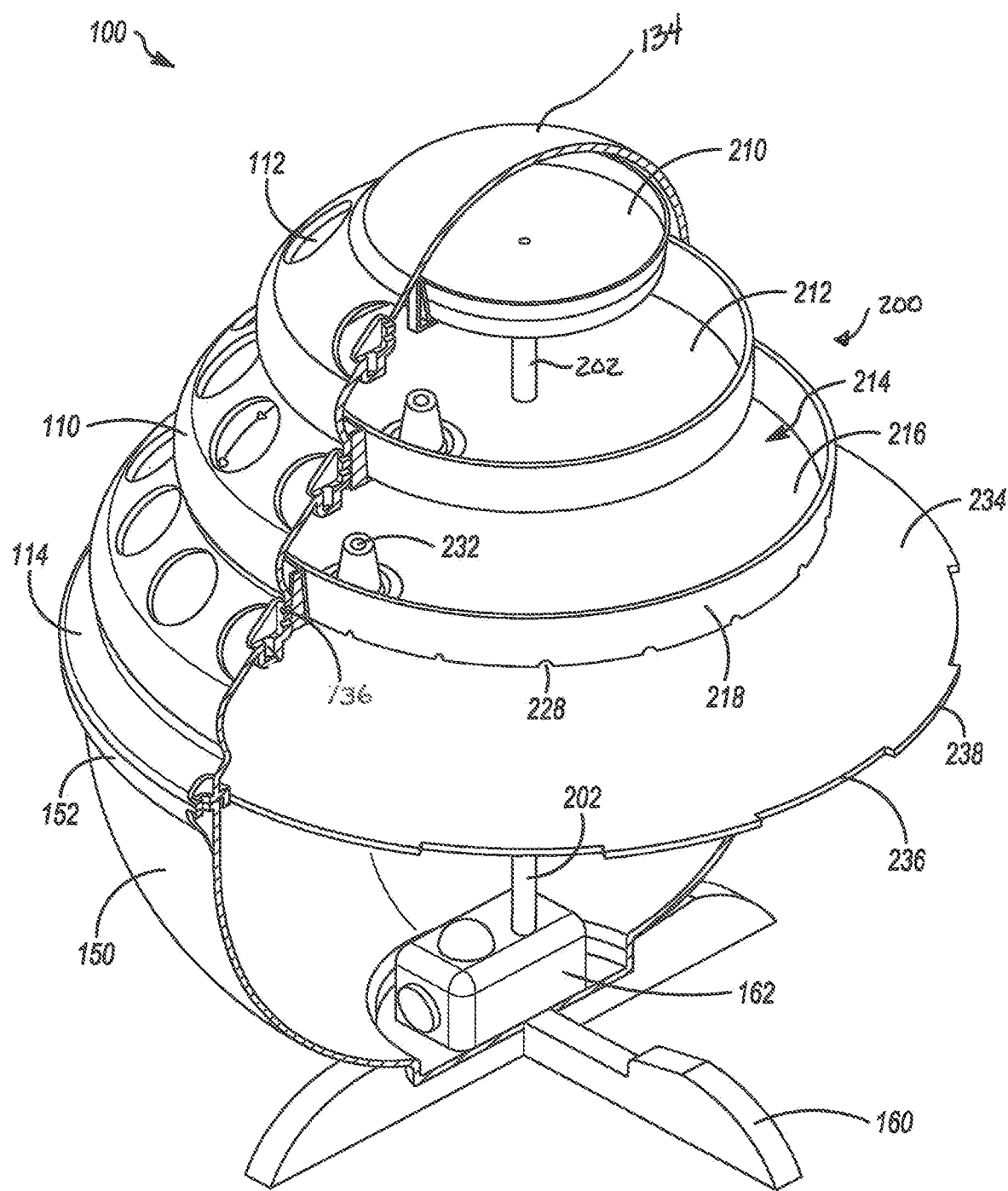
FIG. 3 is an upper perspective, partial cross-sectional view of the plant cultivation apparatus of FIG. 1.

In certain embodiments, the outer housing member 110 may include one or more support apertures 136 configured to support the internal components 200 within the chamber 118 defined by the outer housing member 110. In such embodiments, the one or more support apertures 136 may be positioned in a spaced relationship on the outer housing member 110 and may be positioned proximate to the accessory apertures 120 (as shown in FIGS. 2 and 3).

The contact edge 114 and the reservoir edge 152 may be any suitable geometry to form a mating contact between the contact edge 114 and the reservoir edge 152. For example, the contact edge 114 may include a projection and the reservoir edge 152 may include a groove, wherein the projection is received by the groove. As another example, the contact edge 114 and the reservoir edge 152 may include opposing flanges, such that the flange of the contact edge 114 is located internal to, and adjacent to, the flange of the reservoir edge 152. Embodiments in which the projection, groove, and flange configurations are reversed between the contact edge 114 and the reservoir edge 152, are also contemplated by this disclosure.

The outer housing member 110 and the reservoir 150 may also include features for securing the contact edge 114 to the reservoir edge 152. For example, the outer housing member 110 may include one or more first attachment apertures 124 and the reservoir 150 may include one or more second attachment apertures 164 that correspond to the one or more first attachment apertures 124. In such an embodiment, an attachment fastener may extend through the first attachment aperture 124 and the second attachment aperture 164 to secure the contact edge 114 to the reservoir edge 152. Another example of a feature for securing the contact edge 114 to the reservoir edge 152 is one or more magnets disposed on the contact edge 114 and/or the reservoir edge 152, wherein the contact edge 114 may be magnetically secured to the reservoir edge 152.

In some embodiments, the outer housing member 110 may comprise, in addition to the outer housing member wall 128, an outer housing member cap 134. In such an embodiment, the outer housing member wall 128 may extend upward from the contact edge 114 to define an upper edge 130, the upper edge 130 defining an upper edge opening 132. The outer housing member cap 134 may connect to the upper edge 130 and extend over the upper edge opening 132 to substantially cover the upper edge opening 132, wherein the chamber 118 may be defined within the outer housing member wall 128 and the outer housing member cap 134.

In certain embodiments, the outer housing member 110 may include one or more plant receiving apertures 112 defined on the outer housing member wall 128, the one or more plant receiving apertures 112 configured to receive and retain a plant pod assembly 402. The one or more plant receiving apertures 112 may have any suitable shape and size to receive a plant pod assembly 402 such as that depicted in FIGS. 5A and 5B. For example, the plant receiving apertures 112 may be circular, square, triangular, or any other shape. Additionally, in embodiments in which the plant receiving apertures 112 are circular, the diameter of the plant receiving apertures 112 may have a value that is one inch, two inches, three inches, etc.

As best shown in FIG. 1, in some embodiments, the outer housing member 110 may include a plurality of plant receiving apertures 112, for example, the embodiment depicted in FIG. 1 contemplates thirty-eight plant receiving apertures 112. In such an embodiment, the plurality of plant receiving apertures 112 may be positioned in a spaced relationship on the outer housing member wall 128 such that the plurality of plant receiving aperture 112 are positioned in one or more rows that extend radially around the outer housing member wall 128.

In such an embodiment, the one or more rows of plant receiving apertures 112 may be uniformly positioned. For example, along a row, the plant receiving apertures 112 may be radially equidistant to one another. Furthermore, in embodiments with three or more rows of plant receiving apertures 112, the rows may be uniformly spaced such that, for example, a distance between a top row of plant receiving apertures 112 and a middle row of plant receiving apertures 112 is substantially equal to a distance between the middle row of plant receiving apertures 112 and a bottom row of plant receiving apertures 112.

Figure 5A:
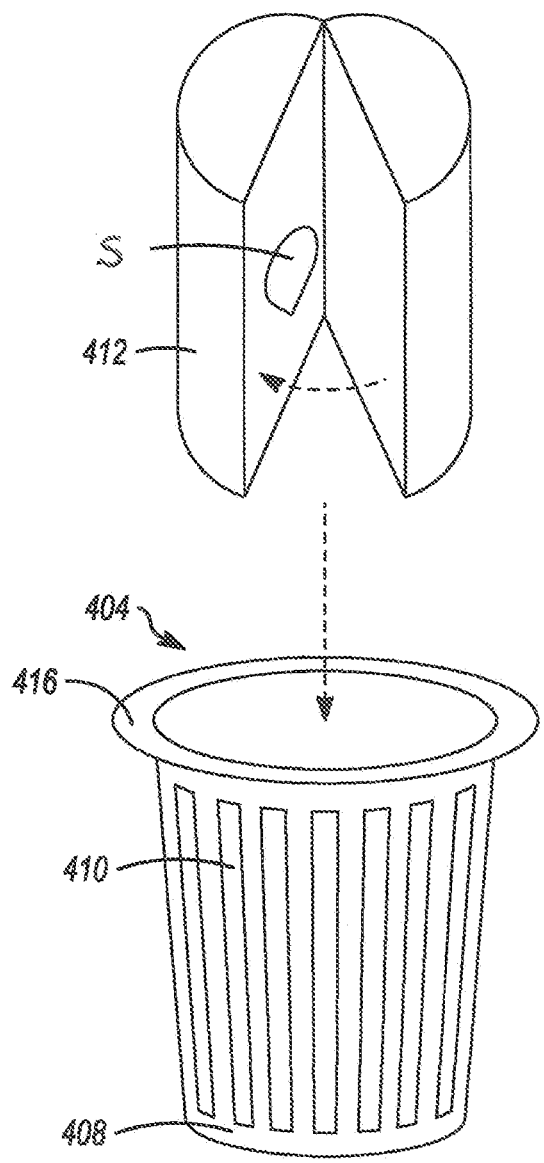
FIG. 5A-B are upper perspective views of embodiments of a container and a seed starting member of the plant cultivation apparatus of FIG. 4.
Figure 5B:
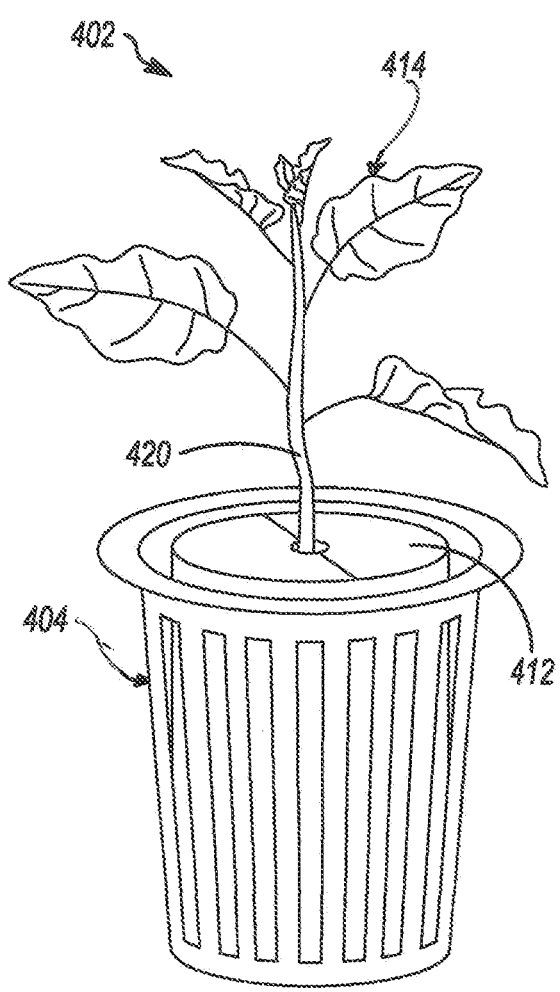
Figure 6:
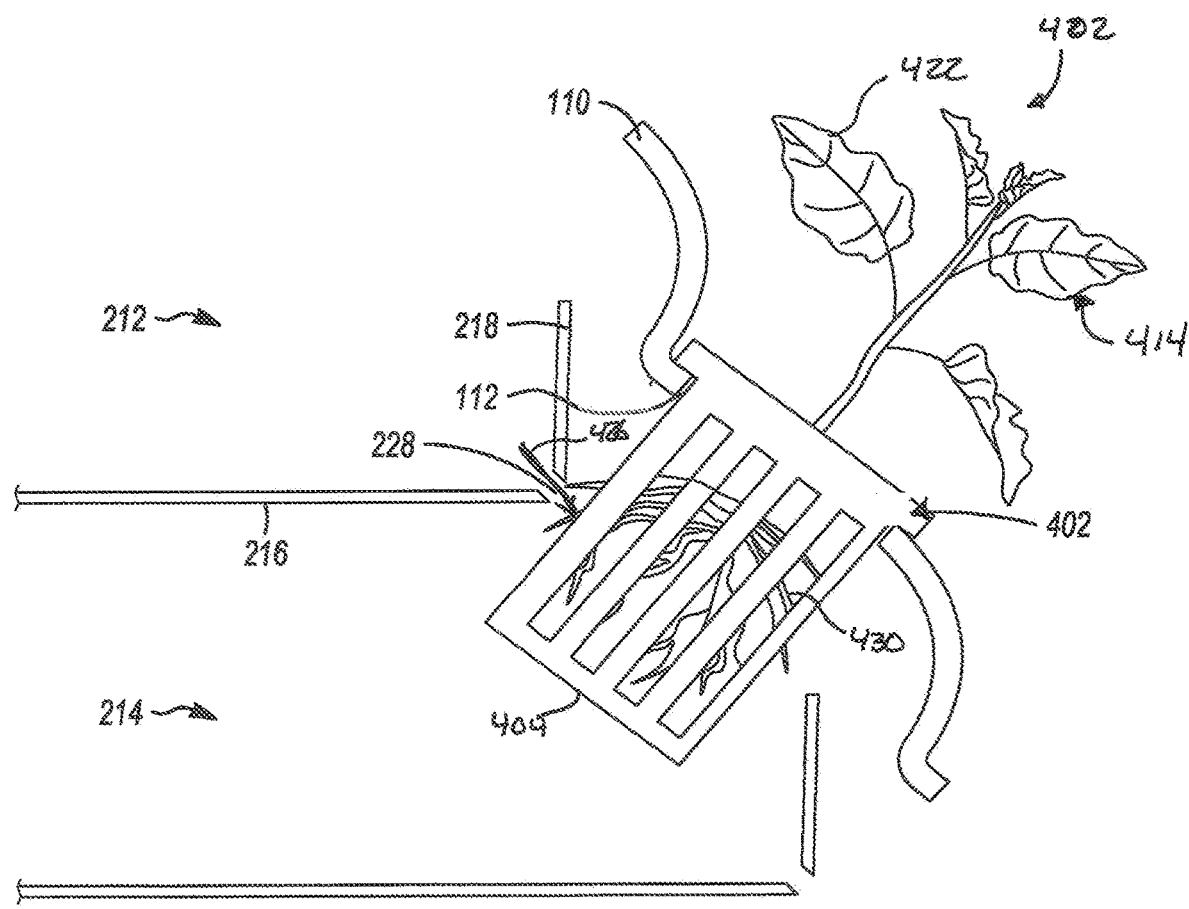
FIG. 6 is a partial, side, cross-sectional view of the container inserted into a plant receiving aperture of the plant cultivation apparatus of FIG. 4.

Referring to FIGS. 5A-B and 6, a plant pod assembly 402 may comprise a container 404 and a plant root structure 430 that is insertable into the container 404 associated with a plant 414. In some embodiments, a plant 414 may be cultivated from a seed, the plant root structure 430 that is insertable in the container 404 may comprise a seed pod 412 into which the seed S may be inserted. The seed pod 412 may be comprised of various media including, but not limited to, nutrient-rich foam, soil, peat, liquid media, porous stone, or any other medium that may facilitate the cultivation of the seed S into a plant 414.

In such an embodiment, as shown in FIG. 5B, the seed may be cultivated such that it develops into a plant 414, the plant 414 having, for example, roots 418, a stem 420, and leaves 422. Once the seed 416 has been cultivated into a plant 414, the seed pod 412 may disintegrate depending on the media forming the seed pod 412. In other embodiments, in which an existing plant 414 may be cultivated, the plant root structure 430 may comprise only of bare roots 418 of a plant 414.

The container 404 may be configured to be insertable into the one or more plant receiving apertures 112 and may comprise a body 408 and a rim 416. The body 408 may have any shape such that it may pass through the plant receiving apertures 112. For example, as shown in FIGS. 5A and 5B, the body 408 may have a shape that is substantially cylindrical. When a plant pod assembly 402 is inserted into a plant receiving aperture 112, the body 408 of the container 404 may extend into the chamber 118 of the outer housing member 110. The body 408 may be configured to receive a plant root structure 430 and may contain a plurality of openings 410 that allow the fluid 424 to contact the plant root structure 430. The openings 410 may have any suitable shape to allow sufficient fluid 424 to contact the plant root structure 430 to facilitate the cultivation of a plant 414. For example, as shown in FIGS. 5A-B, the openings 410 may be parallel longitudinal apertures that extend perpendicularly from the circular rim 416.

The rim 416 may extend laterally outward from a superior portion of the body such that the rim 416 may rest upon the outer housing member wall 128 of the outer housing member 110 when the plant pod assembly 402 is inserted into the one or more plant receiving apertures 112. The rim 416 may have any shape such that sufficient material may contact the outer housing member wall 128 to support the container 404 in the plant receiving apertures 112. For example, the rim 416 may have a shape that is circular, rectangular, square, triangular, or any other shape.

The container 404 may define an axis that extends laterally through the body 408 of the container 404, such that when a plant is inserted into a specific pant receiving aperture 112 of the outer housing member wall 128, the axis may be positioned at an angle relative to the central shaft 202. The axis of the container 404 may be positioned at an angle of between 30 degrees and 60 degrees relative to the central shaft 202. For example, in one embodiment where the plant root structure 430 includes a seed pod 412, a greater angle (closer to 60 degrees) relative to the central shaft may better facilitate cultivation of a plant 414.

As another example, in an alternative embodiment where the plant root structure 430 includes bare roots 418 of a plant 414, a lesser angle (closer to 30 degrees) relative to the central shaft may better facilitate cultivation of the plant 414. In either embodiment mentioned, or in any of the various additional potential embodiments, the plant cultivation apparatus 100 may be configured such that the fluid 424 may pass through one or more plant pod assemblies 402 before being reintroduced into the central chamber 156 of the reservoir 150.

As shown in FIGS. 2 and 3, in select embodiments, the internal components 200 may include a pump 162, a central shaft 202 operatively connected to the pump 162, and one or more trays 208 positioned along central shaft 202. In such embodiments, the pump 162 may operate to convey the fluid 424 from the central chamber 156 of the reservoir 150, through the central shaft 202, and into contract with the one or more trays 208. The fluid 424 may then fall through one or more drain apertures 228 of one or more trays 208 before being reintroduced into the central chamber 156 of the reservoir 150. In embodiments with two or more trays 208, the fluid 424 may cascade between the two or more trays 208 before being reintroduced into the central chamber 156 of the reservoir 150.

The central shaft 202 may have a first end 204 terminating in the central chamber 156 of the reservoir 150, a second end 206 that is opposite the first end 204, and a length extending between the first end 204 and the second end 206. In select embodiments, the central shaft 202 may extend in a direction generally upward and out of the central chamber 156 of the reservoir 150. Additionally, the central shaft 202 may be configured such that the fluid 424 may be conveyed through the central shaft 202. For example, the central shaft 202 may be configured to be a hollow tube, inside which the fluid 424 may travel.

The pump 162 may be positioned within the central chamber 156 of the reservoir 150, or may be formed integrally with reservoir 150. As shown in FIGS. 2 and 3, the pump 162 may be located at a base portion of the central chamber 156 of the reservoir 150. The pump 162 may be operatively connected to the first end 204 of the central shaft 202. The pump 162 may facilitate the conveyance of the fluid 424 from the central chamber 156 of the reservoir 150 into the central shaft 202 at its first end 204. The fluid 424 may then come into contact with one or more of the one or more trays 208. For example, in embodiments with two or more trays 208, the pump 162 may facilitate the conveyance of fluid 424 to only one of the two or more trays 208, or may facilitate the conveyance of fluid 424 to all of the two or more trays 208. The pump 162 may be configured to operate by receiving electrical power through a pump power cable 166 in electrical communication with a power source (e.g., a wall outlet).

The one or more trays 208 may be positioned in a spaced relationship along the length of central shaft 202. For example, the one or more trays 208 may be positioned equidistant to each other along the length of the central shaft 202. In embodiments with two trays, for example, a top tray 210 may be positioned proximate to the second end 206 of the central shaft 202 and a bottom tray 214 may be positioned proximate to the first end 204 of the central shaft 202. In embodiments with three trays, for example, a top tray 210 may be positioned proximate to the second end 206 of the central shaft 202, a bottom tray 214 may be positioned proximate to the first end 204 of the central shaft 202, and an intermediate tray 212 may be positioned between the top tray 210 and the bottom tray 214.

The one or more trays 208 may have a base 216 that projects radially outward from the central shaft 202 to define an outer edge 240, such that the base 216 is substantially parallel to a horizontal plane. The base 216 of the one or more trays 208 may be formed integrally with the central shaft 202 or may include a shaft aperture 230 that receives the central shaft 202.

For example, in an embodiment where the central shaft 202 extends upward and out of the central chamber 156 of the reservoir 150 in a direction orthogonal to the horizontal plane, the base 216 of the one or more trays 208 may project radially outward from the central shaft 202 such that the base 216 is positioned at an angle of between eighty degrees and one-hundred degrees relative to the central shaft 202. As another example, in an embodiment where the central shaft 202 extends upward and out of the central chamber 156 of the reservoir 150 in a direction that is not orthogonal to the horizontal plane, the base 216 may project radially outward from the central shaft 202 such that the base 216 is positioned at a different angle relative to the central shaft 202 and is substantially parallel to the horizontal plane.

The outer edge 240 of the base 216 of the one or more trays 208 may have a periphery configured to any suitable geometry. For example, the periphery of the outer edge 240 of the base 216 may have a geometry in which a portion of the outer edge 240 is curvilinear. As another example, the periphery of the outer edge 240 of the base 216 may have a geometry in which a portion of the outer edge 240 is straight. As other examples, the periphery of the outer edge 240 of the base 216 may have a geometry that is circular (shown in FIGS. 2, 3 and 7), or can be rectangular, triangular, or various combinations thereof.

In select embodiments with two or more trays 208, the two or more trays 208 may have circumferences of different values. In such embodiments, the two or more trays 208 may be positioned along the central shaft 202 in an order of increasing circumferences from the second end 206 of the central shaft 202 to the first end 204 of the central shaft 202. For example, in an embodiment with two trays 208, the top tray 210 may have a circumference that is smaller than the bottom tray 214. As another example, in an embodiment with three trays, the top tray 210 may have a circumference that is smaller than the intermediate tray 212, and the intermediate tray 212 may have a circumference that is smaller than the bottom tray 214.

Figure 7:
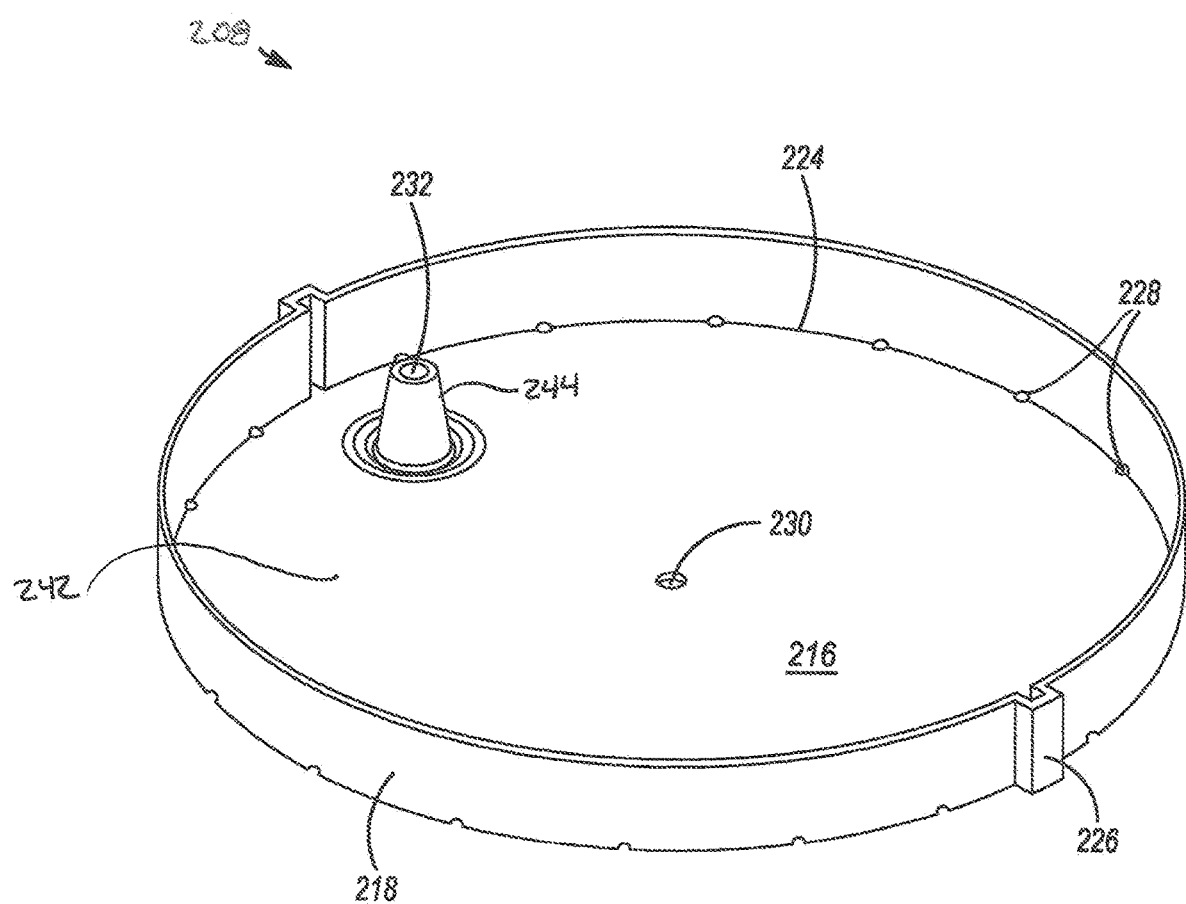
FIG. 7 is an upper perspective view of a tray of the plant cultivation apparatus of FIG. 4.

Referring to FIG. 7, the one or more trays 208 may include a side wall 218 contiguously connected to, and extending around, the outer edge 240 of the base 216 to form a junction 224 where the base 216 joins with the side wall 218. The side wall 218 may project upward from the base 216 in a direction generally toward the second end 206 of the central shaft 202, wherein the base 216 and the side wall 218 cooperatively form a tray reservoir 242. For example, the side wall 218 may project upward at an angle of between eighty degrees and one-hundred degrees relative to the base 216. The side wall 218 can be of any sufficient height to retain a suitable volume of fluid 424 within the tray reservoir 242 in circumstances where the plant cultivation apparatus 100 may be placed on a suitable surface.

Figure 4:
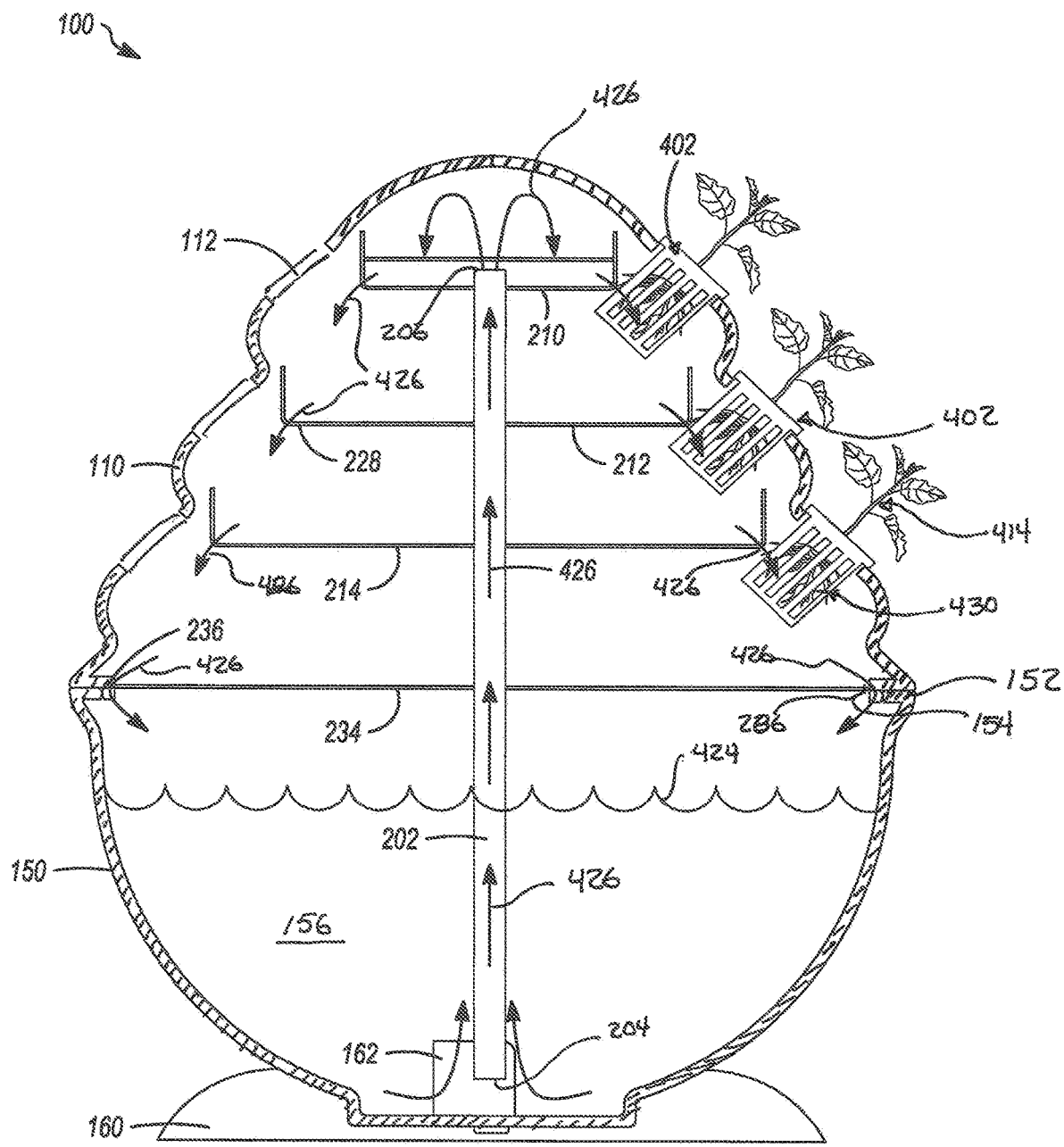
FIG. 4 is a schematic, cross-sectional view depicting fluid travel within another embodiment of a plant cultivation apparatus as disclosed herein.

In select embodiments, the one or more trays 208 may include a plurality of drain apertures 228 positioned proximate to the junction 224 between the side wall 281 and the base 216. Referring to FIGS. 4 and 5, in some embodiments the plurality of drain apertures 228 may be positioned immediately above each of the one or more plant pod assemblies 402 inserted into one or more of the plant receiving aperture 112. In such embodiments, the plurality of drain apertures 228 may operate such that, when the fluid 424 is pumped out of the central chamber 156 of the reservoir 150 and into contact with the one or more trays 208, the fluid 424 may accumulate in the tray reservoir 242 and fall through the plurality of drain apertures 228 into contact with the one or more plant pod assemblies 402 located below the respective tray 208 in the manner depicted by arrows 426.

The plurality of drain apertures 228 may have any suitable configuration to control a stream of the fluid 424 passing through the plurality of drain apertures 228. For example, the plurality of drain apertures may be circular, rectangular, or oval shape, and may have any size suitable to provide a stream of fluid 424 to the one or more plant pod assemblies 402 that may facilitate the cultivation of the various plants 414 inserted in the respective plant receiving apertures 112. It is also considered to be within the purview of this disclosure that the associated plant pod assemblies 402 may receive fluid 424 by any suitable method, including but not limited to splash irrigation, spray irrigation, flood irrigation, drip irrigation, wick irrigation, fog irrigation, ebb and flow irrigation, and other irrigation methods. Such methods are made possible, in part, due to the configuration of the plurality of drain apertures 228.

As best shown in FIG. 4, in which the arrows 426 represent the flow of the fluid 424 within the plant cultivation apparatus 100, in certain embodiments with three trays 208, the fluid 424 may cascade down the three trays 208 before falling into the central chamber 156 of the reservoir 150. For example, the fluid 424 may accumulate in a tray reservoir 242 of a top tray 210. The fluid may then fall through a plurality of drain apertures 228 of the top tray 210 and accumulate in a tray reservoir 242 of an intermediate tray 212. The fluid 424 may then fall through a plurality of drain apertures 228 of the intermediate tray 212 and accumulate in a tray reservoir 242 of a bottom tray 214. The fluid 424 may then fall through a plurality of drain apertures 228 of the bottom tray 214 to be reintroduced into the central chamber 156 of the reservoir 150.

It will be readily apparent to a person having ordinary skill in the art that the cascading process as previously described with three trays 208 may also be performed with respect to a greater or fewer number of trays 208. For example, the cascading process may be performed with two trays 208, four trays 208, or any other number of trays 208.

It is contemplated by this disclosure that the fluid 424 that may accumulate within the tray reservoir 242 of the one or more trays 208 if the fluid 424 is being pumped into the tray reservoir 242 at a higher rate than the rate at which the fluid 424 is being drained out of the tray reservoir 242 through the plurality of drain apertures 228. Therefore, in some embodiments, the one or more trays 208 may include an overflow wall 232 that defines an overflow aperture 232.

The overflow wall 244 may project upward from the base 216 of the one or more trays 208 in a direction similar to that of the side wall 218, and may be positioned within the tray reservoir 242 of the one or more trays 208 such that the overflow aperture 232 defined in each respective overflow wall 244 are positioned directly above another one (in embodiments with two or more trays) and the central chamber 154 of the reservoir 150. The overflow wall 244 may have a height that is less than that of the associated side wall 218, such that fluid that accumulates in the reservoir 242 of the one or more trays 208 and may flow over the overflow wall 244 and through the overflow aperture 232 before the fluid 424 flows over the side wall 218 of the one or more trays 208.

In certain embodiments, the one or more trays 208 may include one or more attachment projections 226 connected to the side wall 218 and projecting radially outward therefrom. The one or more attachment projections 226 may correspond with, and be positioned adjacent to, the support apertures 136 of the outer housing member 110. A mechanical fastener may secure the attachment projections 226 to the support apertures 124 of the outer housing member 110. For example, a threaded fastener may extend through the support apertures 1 36 of the outer housing member and into the attachment projections 226 to support the one or more trays 208 within the chamber 118 of the outer housing member 110.

It is contemplated by this disclosure that the one or more plant pod assemblies 402 may discharge debris during cultivation. To prevent debris from contaminating the central chamber 156 of the reservoir 150, referring to FIG. 3, the internal components 200 of the plant cultivation apparatus 100 may also include a separation plate 234. The separation plate 234 may be positioned along the length of central shaft 202 and proximate to the first end 204 of the central shaft 202 relative to the one or more trays 208. For example, in some embodiments the separation plate 234 may be positioned below the one or more trays 208. The separation plate 234 may be configured to generally separate the chamber 118 of the outer housing member 110 from the central chamber 156 of the reservoir 150.

The separation plate 234 may project radially outward from the central shaft 202 to define a boundary 238. The separation plate 234 may be formed integrally with the central shaft 202 or may include a shaft aperture 246 that receives the central shaft 202. The boundary 238 may have a geometry that substantially matches the geometry of the contact edge opening 116 of the outer housing member 110 and/or reservoir opening 154 of the reservoir 150. The separation plate 234 may also include a plurality of recessed portions 236 that project inward from the boundary 238 in a direction generally toward the central shaft 202, wherein the fluid 424 may fall through the plurality of the recessed portion 236 and into the central chamber 156 of the reservoir 150.

To facilitate the flow of fluid 424 toward the recessed portions 236 of the separation plate 234, the separation plate 234 may have a curved shape, such that the curved shape is concave about the first end 204 of the central shaft 202. As an example of the integration of the separation plate 234 into the flow of fluid 424 within the plant cultivation apparatus 100, the fluid 424 may be pumped out of the central chamber 156 of the reservoir 150 and into contact with the one or more trays 208. The fluid 424 may then cascade through the drain apertures 228 of the one or more trays 208 while contacting the one or more plant pod assemblies 402. After cascading down the one or more trays 208, the fluid 424 may fall upon the separation plate 234, whereby the fluid 424 may flow toward the recessed portions 236 of the separation plate 234 before falling through the recessed portions 236 where it may be reintroduced into the central chamber 156 of the reservoir 150.

It is contemplated by this disclosure that the separation plate 234 may also operate to reduce the volume of a sound associated with the fluid 424 falling into the central chamber 156 of the reservoir 150 by reducing the distance by which the fluid 424 falls into the central chamber 156. For example, fluid 424 falling into the central chamber 156 from the one or more trays 208 may result in a splashing sound that is louder than the splashing sound that may result from fluid 424 falling from the separation plate 234 into the central chamber 156 because the separation plate 234 is positioned proximate to the central chamber 156 relative to the one or more trays 208.

It is also contemplated by this disclosure that the plant cultivation apparatus 100 may be used in environments where sunlight exposure is below what is required to support adequate photosynthesis to facilitate plant growth (e.g., indoor environments, covered environments, etc.). When the plant cultivation apparatus 100 is used in such environments, it may be desired to employ a lighting system 300 that provides artificial light to the plant cultivation apparatus 100 to supplement sunlight exposure or to provide all light required to support plant growth.

Figure 8:
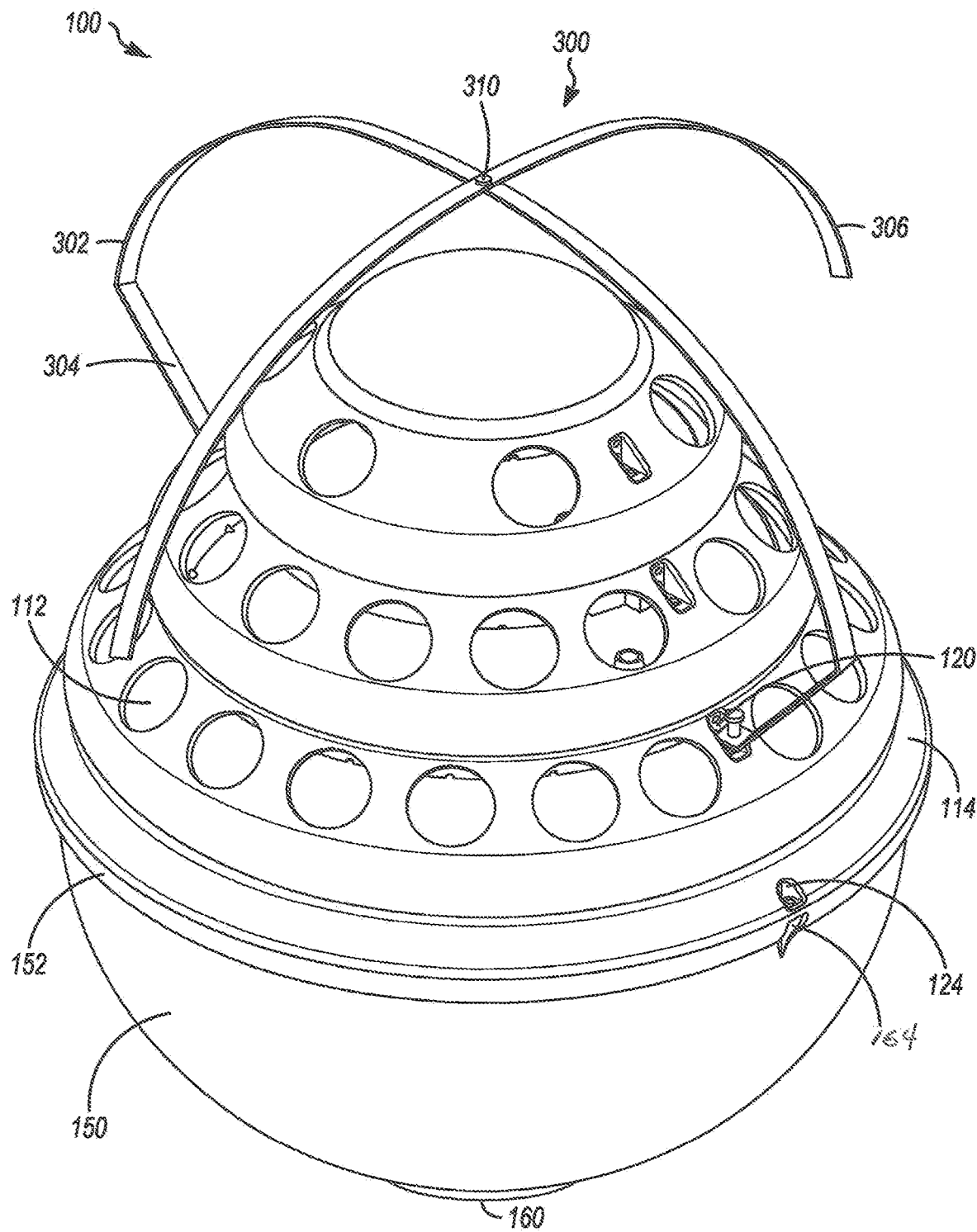
FIG. 8 is an upper perspective view of another embodiment of a plant cultivation apparatus as disclosed herein.

Referring to FIGS. 8 and 9, in select embodiments, the plant cultivation apparatus 100 may include a lighting system 300 connecting to the plant cultivation apparatus 100. In such embodiments, the lighting system 300 may be attachable to one or more of the accessory apertures 120 of the outer housing cover 110, and comprise a support member 302 and a light source 308 connecting to the support member 302, such that the light source 308 is suspended substantially above the outer housing member 110 and is oriented to direct electromagnetic radiation (e.g., light) generally toward the outer housing cover 110. The support member 302 may be any suitable shape to suspend the light source 308 above the outer housing member 110. The lighting system 300 may be configured to operate by receiving electrical power through a lighting system wire 314 in electrical communication with a power source (e.g., a wall outlet).

In certain embodiments, the support member 302 may comprise an elongated body member having two ends, a first end attachable to an accessory aperture 120 defined in the outer housing member 110 and a second end attachable to another accessory aperture 120 of the outer housing member 110. The elongated body member of the support member 302 may be configured to extend over the outer housing member 110. In such an embodiment, the support member 302 may be formed from a strip of material that bends over the outer housing member 110, such that the support member 302 forms a curved shape over the outer housing member 110, the curved shape being concave about the plant cultivation apparatus 100. Further, in such an embodiment, the light source 308 may be connected to a surface of the elongated body member of the support member 302 that faces the outer housing member 110, such that the light source 308 faces the outer housing member 110 and may direct light toward the outer housing member 110.

In alternative embodiments, the support member 302 may comprise an elongated body member, a first intermediate strut 304 and a second intermediate strut 304. The elongated body member may have a first end and a second end, such that the first intermediate strut 304 is contiguously connected to the first end of the elongated body member, and the second intermediate strut 304 is contiguously connected to the second end of the elongated body member. In such an embodiment, both the first and the second intermediate struts 304 may be attachable to suitable accessory apertures 120 of the outer housing member 110.

In select embodiments, the first and second intermediate struts 304 may be configured such that a length of the first and second intermediate struts 304 are adjustable. For example, the first and second intermediate struts may be configured to include a telescoping mechanism, such that portions of the first and second intermediate struts 304 may slide within one another to extend the length of the first and second intermediate struts 304. As another example, the first and second intermediate struts 304 may be configured to accept an additional portion of material, such that a length of material may be attached to the end of the first and second intermediate struts 304, between the end and the one or more accessory apertures 120 of the outer housing member 110, to extend the length of the first and second intermediate struts 304.

The light source 308 may be any suitable device operable to emit light that may support photosynthesis. In some embodiments, the light source 308 may be one or more light emitting diodes (LEDs). In such an embodiment, the one or more LEDs may be configured to emit electromagnetic radiation at a range of wavelengths conducive for photosynthesis. For example, the one or more LEDs may be configured to emit electromagnetic radiation between wavelengths corresponding to ultraviolet radiation and wavelengths corresponding to infrared radiation (e.g., full spectrum LEDs). As another example, the one or more LEDs may be configured to emit electromagnetic radiation between a narrower range of wavelengths.

Additionally, in embodiments where the light source 308 comprises LEDs, the LEDs may be configured to emit light at any angle of light spread sufficient to expose plants 414 inserted into the outer housing member 110 to a sufficient amount of light to support adequate photosynthesis to facilitate plant growth. For example, forty degrees of light spread, sixty degrees of light spread, ninety degrees of light spread, etc.

In certain embodiments, the light source 308 may comprise strips of LEDs that include a plurality of LEDs (e.g., twenty LEDs, thirty LEDs, etc.). In such embodiments, the strips of LEDs may be positioned along the support member 302 such that the strips of LEDS direct light toward the outer housing member 110. As an example, in embodiments with a support member 302 that includes an elongated body member extending over the outer housing member 110, the strips of LEDs may be positioned along the elongated body member such that the strips of LEDs may be oriented to direct light toward the outer housing member 110.

Figure 11:
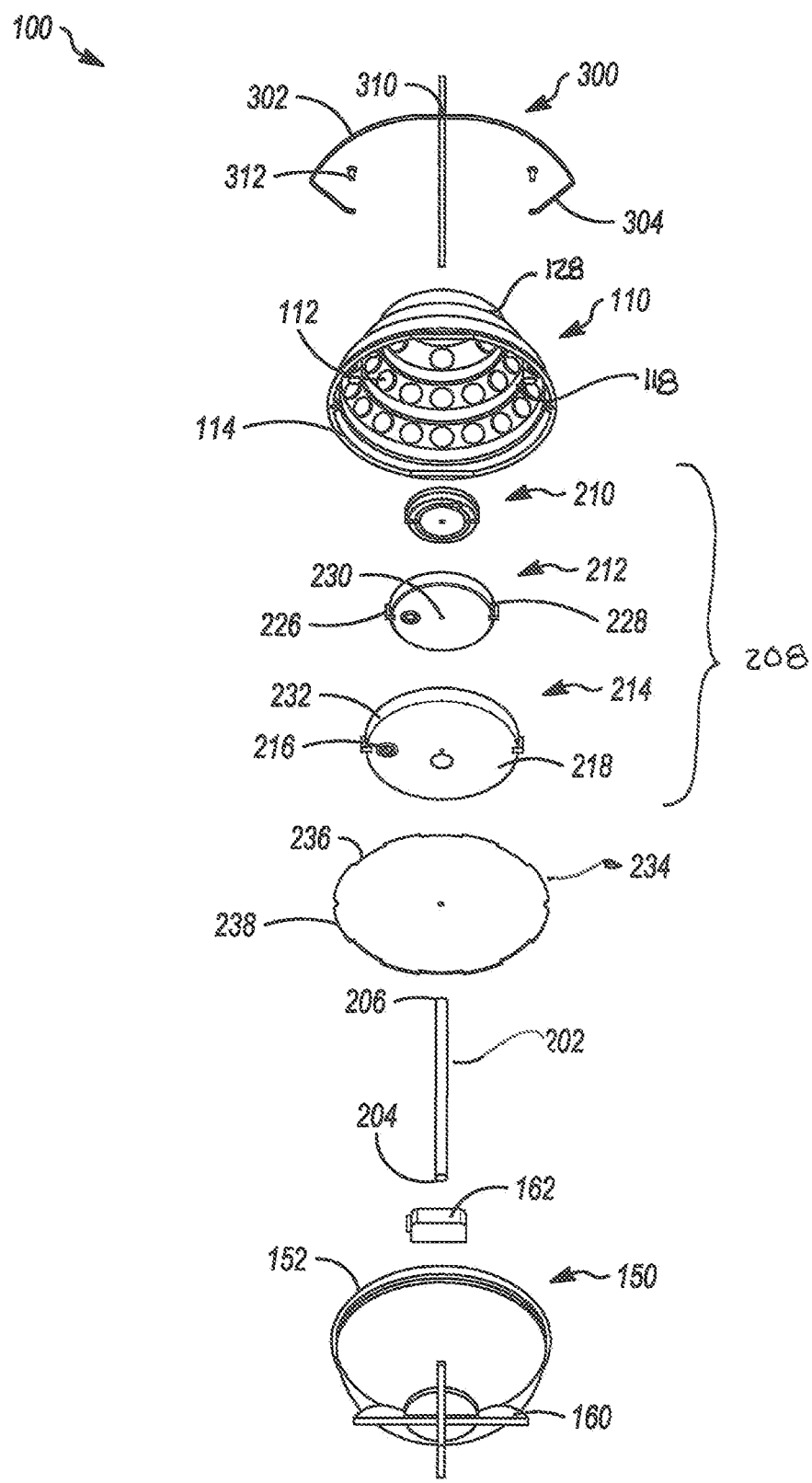
FIG. 11 is a lower perspective, exploded view of the plant cultivation apparatus of FIG. 8.
Figure 12:
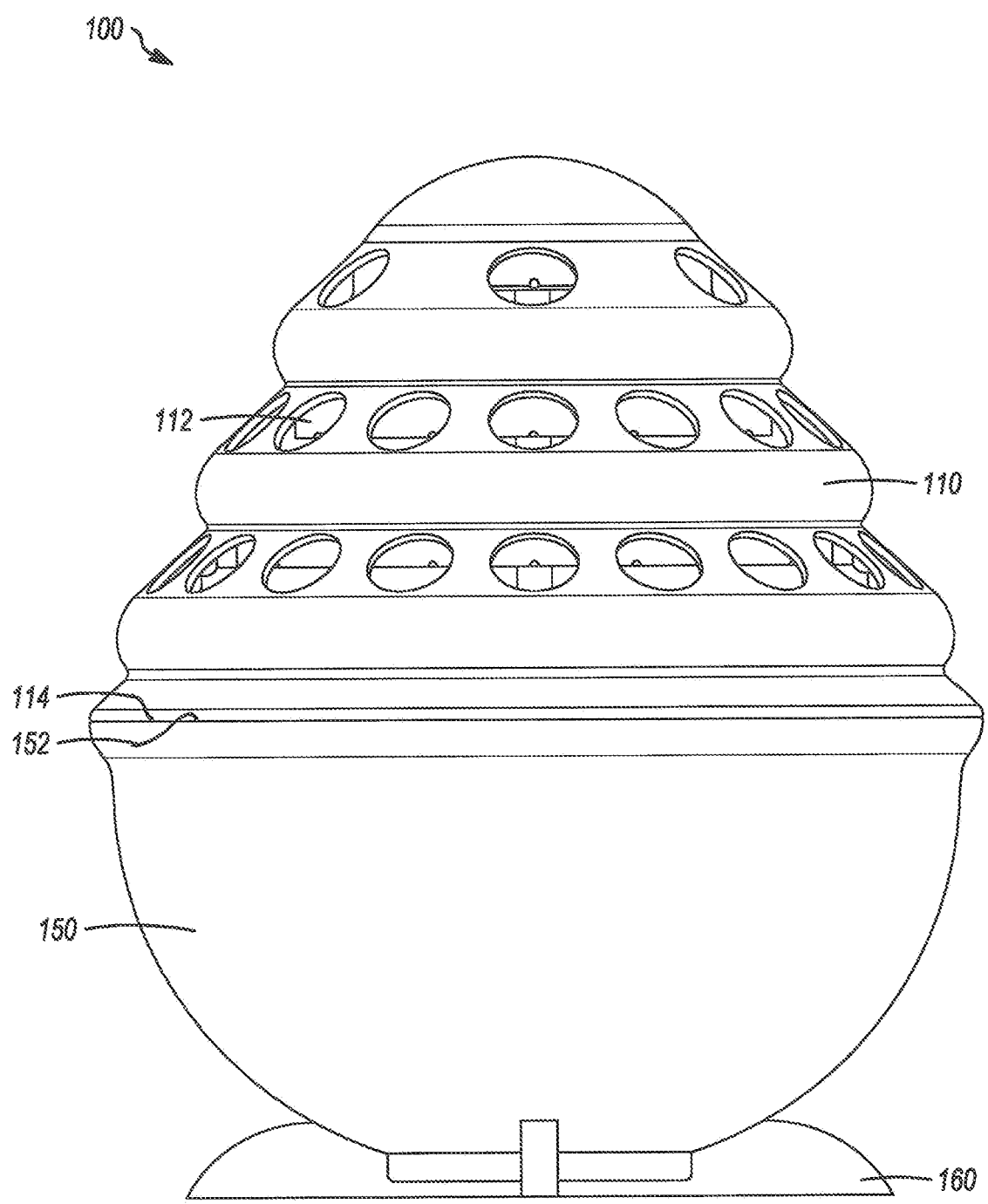
FIG. 12 is a side elevation view of the plant cultivation apparatus of FIG. 1.
Figure 13:
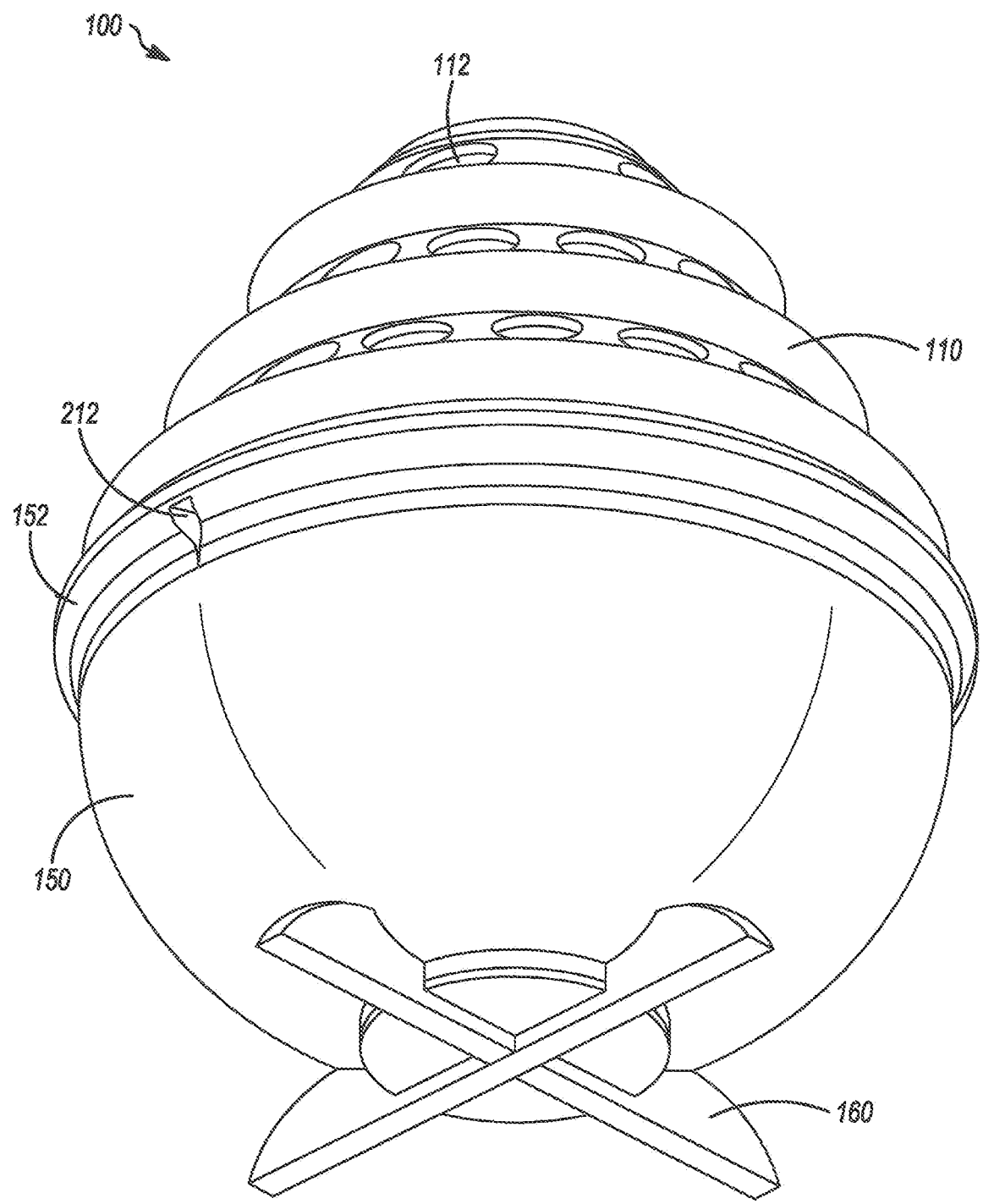
FIG. 13 is a lower perspective view of the plant cultivation apparatus of FIG. 1.
Figure 14:
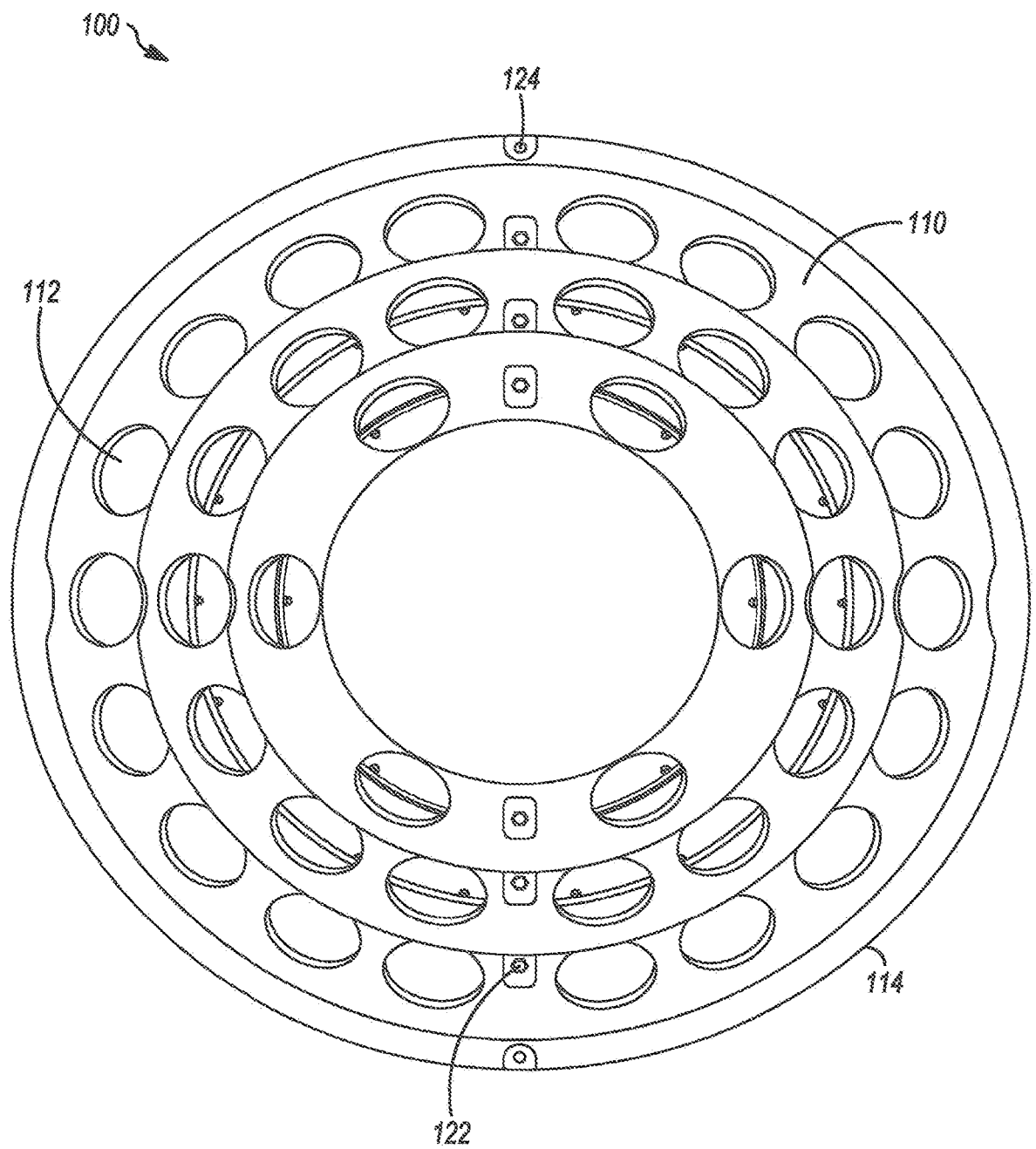
FIG. 14 is a top view of the plant cultivation apparatus of FIG. 1.
Figure 15:
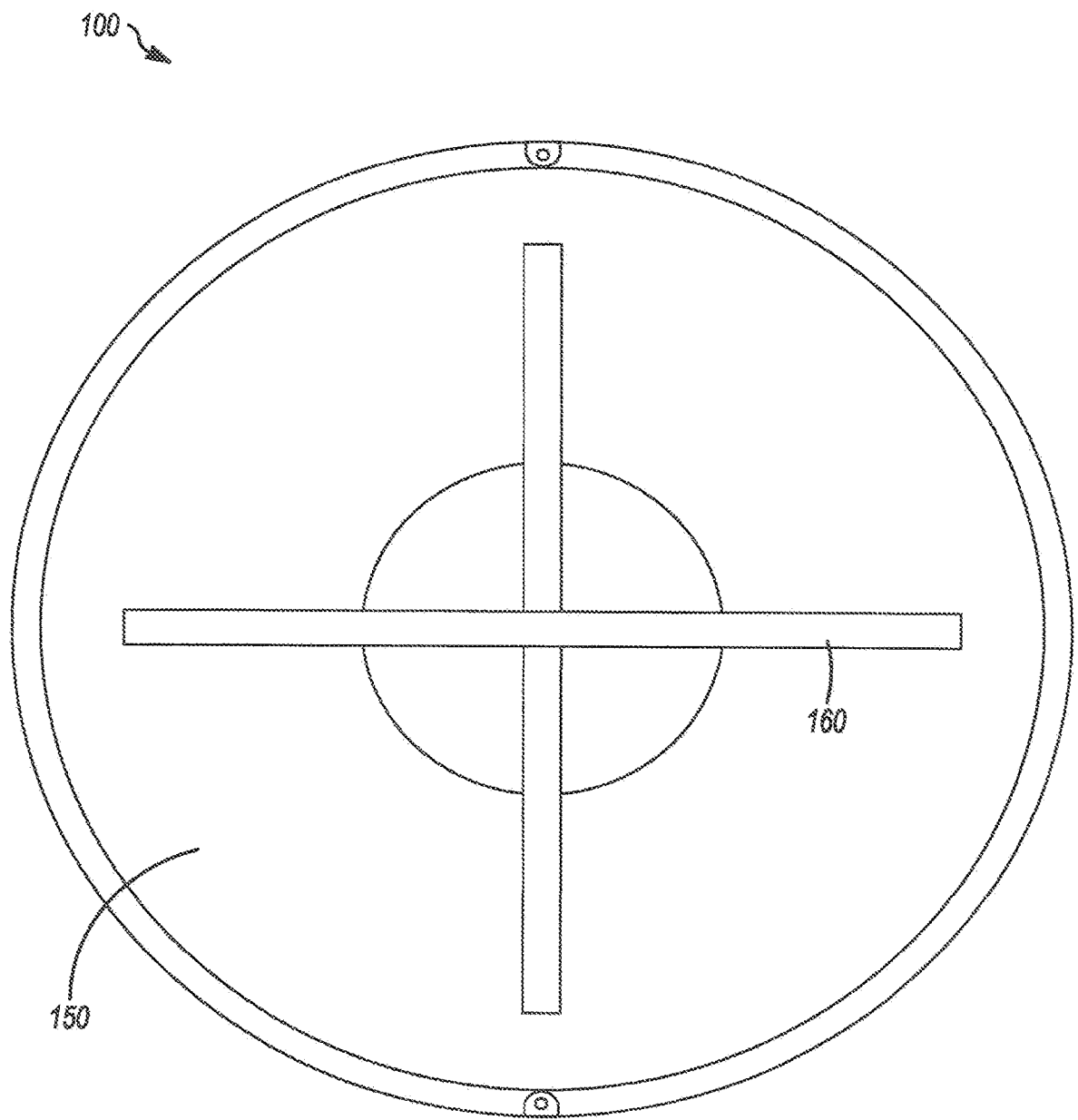
FIG. 15 is a bottom view of the plant cultivation apparatus of FIG. 1.
Figure 16:
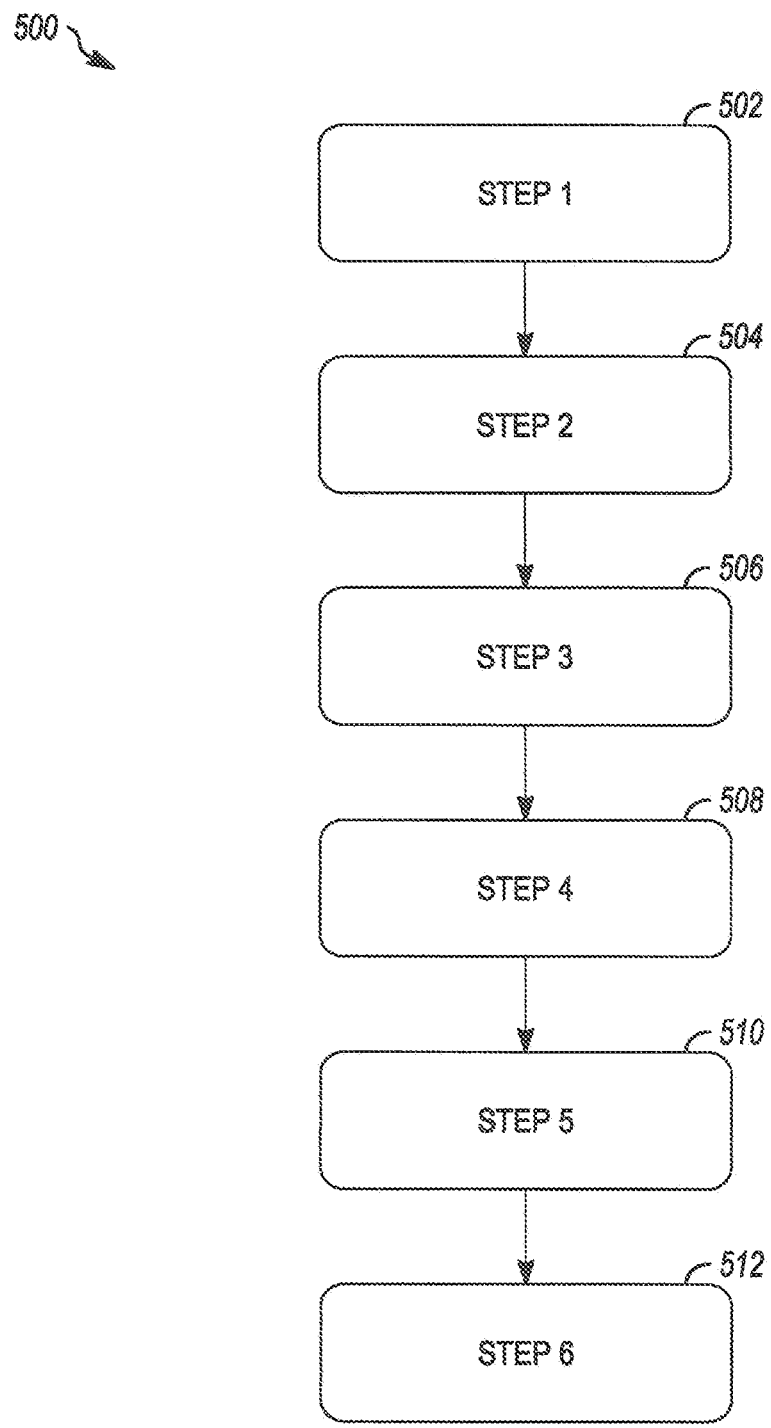
FIG. 16 is a flow diagram of a method for hydroponically growing plants.

As shown in FIGS. 8 and 9, in some embodiments with a support member 302 that extends over the outer housing member 110, the lighting system 300 may further include one or more cross members 306 connectable to the support member 302. The one or more cross members can be connected to the outer housing member 110 by suitable means such as connectors 312 as depicted in FIG. 11. In such embodiments, the one or more cross members may be configured to support one or more additional light sources 308. For example, a cross member 306 may connect to a top portion of the support member 302 as at a connection point 310 and extend over the outer housing member 110 in a direction perpendicular to the support member 302. Furthermore, an additional light source 308 (e.g., a strip of LEDs) may be positioned along the cross member 306. In embodiments where the cross member 306 comprises an elongated strip of material, the additional light source may be positioned on a side of the cross member 306 facing the outer housing member 110 such that light may be directed toward the outer housing member 110.

In some embodiments, the one or more cross members 306 may be pivotably connected to the support member 302, such that the one or more cross members 306 may rotate with respect to the support member 302. In such an embodiment, the one or more cross members 306 may be connectable to the support member 302 with a mechanical fastener. For example, the one or more cross members 306 may be attachable to the support member 302 with a machine screw and a corresponding nut. As another example, the one or more cross members 306 may be attachable to the support member 302 with a rivet.

Although examples of configurations of the lighting system 300 have been provided, it will be readily understood by someone having ordinary skill in the art that the support member 302 may be configured in any suitable geometry that may position one or more light sources 308 such that light may be directed substantially toward the outer housing member 110. For example, the support member may connect at only one location on the outer housing member 110 wherein a ring of LEDs may be suspended over the outer housing member 110 by the support member 302. As another example, a plurality of individual light sources 308 may be supported by support members 302 attachable to the accessory apertures 120 of outer housing member 110, wherein the support members 302 may be operable to orient various light sources 308 toward the outer housing member 110.

It is contemplated by this disclosure that it may be desirable to discharge the fluid 424 from the plant cultivation apparatus 100 for cleaning purposes, without requiring disassembly of the plant cultivation apparatus 100. Therefore, in select embodiments, the plant cultivation apparatus 100 may include a drain tube 428 attachable to, and in fluid communication with, the central shaft 202 and that may extend to the exterior of the outer housing member 110. The drain tube 428 may be configured to discharge fluid 424 out of the plant cultivation apparatus 100 such that the chamber 118 of the outer housing member 110, the central chamber 156 of the reservoir 150, and the internal components 200 may be cleaned.

To discharge the fluid 424 from the plant cultivation apparatus 100, a first end of the drain tube 428 may be attached to the central shaft 202 at any suitable location along the central shaft 202, wherein a second end of the drain tube 428 may be positioned outside of the outer housing member 110, for example, by extending the drain tube 428 through one of the one or more plant receiving apertures 112. The pump 162 may then be activated to cause the fluid 424 to be pumped through the drain tube 428 and out of the plant cultivation apparatus 100.

It is also contemplated by this disclosure that it may be desirable for certain components (e.g., the pump 162 and/or the lighting system 300) of the plant cultivation apparatus 100 to operate autonomously (i.e., without human input or with limited human input). Therefore, in select embodiments, the plant cultivation apparatus 100 may include a smart plug 432 in electrical communication with the pump 162 and/or the lighting system 300. The smart plug 432 may operate such that it causes the pump 162 and/or the lighting system 300 to activate over cycles of predetermined time intervals, the predetermined time intervals depending on the plant 414 being cultivated by the plant cultivation apparatus 100. In other embodiments, the pump 162 and/or the lighting system 300 may electrically communicate with any conventional electrical or mechanical timer to cause the pump 162 and/or the lighting system 300. The conventional electrical or mechanical timer may operate such that it causes the pump 162 and/or lighting system 300 to activate over cycles of predetermined time intervals, the predetermined time intervals being manually inputted into the conventional electrical or mechanical timer.

The predetermined time intervals may, for example, be set in accordance with one or more periods of time during a single day. For example, where the predetermined time interval is set in accordance with one period of time during a single day, the period of time may be between 5:00 AM and 12:00 PM. Accordingly, the smart plug 432 or the conventional electrical or mechanical timer may cause the pump 162 and/or lighting system 300 to be activated between 5:00 AM and 11:00 AM and may cause the pump 162 and/or lighting system 300 to be deactivated between 11:01 AM and 4:59 AM. As another example where the predetermined time interval is set in accordance with two periods of time during a single day, the period of time may be between 5:00 AM and 10:00 AM and between 9:00 PM and 11:00 PM. Accordingly, the smart plug 432 or the conventional electrical or mechanical timer may cause the pump 162 and/or lighting system 300 to be activated between 5:00 AM and 10:00 AM and between 8:00 PM and 11:00 PM, and may cause the pump 162 and/or lighting system to be deactivated between 10:01 AM and 7:59 PM, and between 11:01 PM and 4:59 AM.

The smart plug 432 may electrically communicate with the pump 162 through the pump power cable 166, such that the pump power cable 166 electrically connects the pump 162 to the smart plug 432, whereby the smart plug 432 electrically connects to a power source (e.g., a wall outlet). The smart plug 432 may be configured to cause the pump 162 to operate over cycles of predetermined time intervals, for example, by causing electrical power to be communicated to the pump 162 only during the predetermined time intervals. The smart plug 432 may be configured to cause the pump 162 to activate cyclically for an indefinite period of time, or may be configured to cause the pump 162 to operate only for a select number of cycles (e.g., ten cycles, twenty cycles, thirty cycles, etc.).

The smart plug 432 may operate similarly when in electrical communication with the lighting system 300. The smart plug 432 may electrically communicate with the lighting system 300 through the lighting system wire 314, such that the lighting system wire 314 electrically connects the lighting system 300 to the smart plug 432, whereby the smart plug 432 electrically connects to a power source (e.g., a wall outlet). The smart plug 432 may be configured to cause the lighting system 300 to operate during cycles of predetermined time intervals, for example, by causing electrical power to be communicated to the lighting system 300 only during the predetermined time intervals. The smart plug 432 may be configured to cause the lighting system to activate cyclically for an indefinite period of time, or may be configured to cause the lighting system 300 to operate only for a select number of cycles (e.g., ten cycles, twenty cycles, thirty cycles, etc.).

In certain embodiments, the smart plug 432 may be configured to cause both the pump 162 and the lighting system 300 to activate in cycles of predetermined time intervals. In such embodiments, the smart plug 432 may be configured to cause the pump 162 and the lighting system 300 to operate over the same cycles of predetermined time intervals, or may be configured to cause the pump 162 and the lighting system 300 to operate independently (e.g., over different cycles of predetermined time intervals).

The smart plug 432 may comprise a controller operatively connected to a receiver. The receiver of the smart plug 432 may receive a signal from a remote device, the signal then being communicated to the controller, wherein the controller may cause the pump 162 and/or the lighting system 300 to activate. Examples of remote devices may include a smart phone, a computer, or the like.

In some embodiments, the smart plug 432 may be configured to operate in accordance with a computer program (e.g., a smart phone application) that may allow a user to set the cycles of predetermined intervals. For example, a user may select, on a smart phone application, a cycle of predetermined intervals based on the plant 414 that is being cultivated by the plant cultivation apparatus 100. The smart phone may then send a signal to the receiver of the smart plug 432, which is communicated to the controller, wherein the controller will cause the pump 162 and/or the lighting system 300 to operate in accordance with the selected cycle of predetermined intervals.

In embodiments where a conventional electrical or mechanical timer is employed to cause autonomous operation of the pump 162 and/or lighting system 300, the pump 162 and/or the lighting system 300 may electrically connect to the conventional electrical or mechanical timer. With regard to the pump 162, the pump power cable 166 may electrically connect the pump 162 to the conventional electrical or mechanical timer, whereby the conventional electrical or mechanical timer may electrically connect to a power source (e.g., a wall outlet). With regard to the lighting system 300, the lighting system wire 314 may electrically connect the lighting system 300 to the conventional electrical or mechanical timer, whereby the conventional electrical or mechanical timer may electrically connect to a power source (e.g., a wall outlet).

In such embodiments, the conventional electrical or mechanical timer may be configured to cause the lighting system 300 to operate during cycles of predetermined time intervals, for example, by causing electrical power to be communicated to the lighting system 300 only during the predetermined time intervals. The conventional electrical and mechanical timer may be configured to cause the pump 162 and/or lighting system 300 to activate cyclically for an indefinite period of time, or may be configured to cause the pump 162 and/or lighting system 300 to operate only for a select number of cycles (e.g., ten cycles, twenty cycles, thirty cycles, etc.).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A plant cultivation apparatus comprising:
   a fluid-containing reservoir configured to contain a fluid therein, the reservoir having a central chamber and a reservoir opening defined by a reservoir edge;
   a unitary central shaft having a first end, a second end opposed to the first end, and a length, the first end of the unitary central shaft terminating in the central chamber of the reservoir;
   a plurality of trays directly connected in a spaced relationship along the length of the unitary central shaft in direct contact therewith and projecting radially outward therefrom, wherein each of the plurality of trays has a base having an outer edge joined to a sidewall and wherein the base has a plurality of drain apertures located in spaced relationship along the outer edge of the base at a junction between the base and the sidewall and at least one of the plurality of trays defines a curvilinear periphery; and
   an outer housing member, the outer housing member having a housing member wall defining a main chamber configured to receive the plurality of trays in progressively increasing circumferential value, the outer housing member wall having a contact edge, the contact edge defining a contact edge opening, wherein the contact edge is configured to contact the reservoir edge of the fluid-containing reservoir, the housing member wall having a plurality of plant-receiving apertures defined therein, wherein the plurality of plant-receiving apertures are configured to receive and retain a bare-root plant or a seed starting member, the housing member wall having an inner surface,
   wherein the plurality of trays each have a different outer peripheral value, and wherein the plurality of trays are positioned on the unitary central shaft in progressively increasing outer peripheral area from the second end of the unitary central shaft to the first end of the unitary central shaft; and
   wherein the plurality of drain apertures in one of the plurality of trays correspond in number to a number of plant receiving apertures defined in the outer housing member located immediately below the associated tray and wherein each respective drain aperture is located above the associated plant receiving aperture.

2. The plant cultivation apparatus of claim 1, further comprising a pump mechanism located in the central chamber of the reservoir, wherein the first end of the unitary central shaft is operatively connected to the pump mechanism and wherein the second end of the unitary central shaft is in fluid communication with at least one of the plurality of trays, the pump mechanism configured to convey the fluid from the first end of the unitary central shaft to the second end of the unitary central shaft and into contact with the respective tray proximate to the second end of the unitary central shaft.

3. The plant cultivation apparatus of claim 2, wherein the plurality of plant-receiving apertures defined in the outer housing member are arranged in a plurality of rows disposed horizontally relative to the contact edge, wherein a number of plurality plant-receiving apertures are disposed in each respective row are disposed in spaced relationship to one another and wherein a number of plant-receiving apertures present in a first row of plant-receiving apertures includes a number of plant-receiving apertures greater than a number of apertures present in a second row of plant receiving apertures located immediately above the first row.

4. The plant cultivation apparatus of claim 3, wherein the second row of plant receiving apertures is indexed relative to the position of the plant-receiving apertures of the first row.

5. The plant cultivation apparatus of claim 3, wherein the base of at least one of the plurality of trays includes at least one elevated drain aperture, wherein the sidewall of the tray has a sidewall height and wherein the elevated drain aperture extends in the same direction as the sidewall but does not extend beyond the sidewall height.

6. The plant cultivation apparatus of claim 1 wherein each respective plant-receiving aperture defined in the outer housing member is positioned proximate to and below a respective drain aperture defined in an associated tray.

7. The plant cultivation apparatus of claim 1, further comprising a separator plate positioned along the length of the unitary central shaft and proximate to the reservoir opening, the separator plate projecting radially outward from the unitary central shaft to define a boundary, the boundary substantially matching a geometry of the reservoir opening, wherein the separator plate includes a plurality of water-conveying recesses located in spaced relationship along the boundary and extending inward toward the unitary central shaft.

8. The plant cultivation apparatus of claim 7, wherein the separator plate has a shape that is concave about the first end of the unitary central shaft.

9. The plant cultivation apparatus of claim 1, wherein the fluid is a plant nutrient solution.

10. The plant cultivation apparatus of claim 1, wherein the outer housing member further includes a plurality of accessory attachment apertures located in spaced relationship therein.

11. The plant cultivation apparatus of claim 10, further comprising a lighting system, the lighting system comprising:
    a support member removably connected to one or more of the accessory attachment apertures of the outer housing member; and
    a light source connecting to the support member, the light source being positioned substantially above the outer housing member, and the light source operable to emit light in a direction generally toward the outer housing member.

12. The plant cultivation apparatus of claim 11, wherein the support member comprises:
    an elongated body member having a first end, a second end opposed to the first end, and a length extending therebetween;
    a first intermediate strut contiguously connected to the first end, the first intermediate strut removably connected to a first location on the outer housing member; and
    a second intermediate strut contiguously connected to the second end, the second intermediate strut removably connecting to a second location on the outer housing member;
    wherein the elongated body member length has a curved shape having an axis of symmetry extending along the length of the unitary central shaft, and the curved shape being concave about the first end of the unitary central shaft.

13. The plant cultivation apparatus of claim 12, wherein the light source comprises a plurality of light emitting diodes positioned along the length of the support member, the light emitting diodes oriented to emit light in a direction generally toward the outer housing member.

14. The plant cultivation apparatus of claim 13, wherein the lighting system further includes a cross member having a length, the cross member connected to the support member, the cross member including a second light source, the second light source is a plurality of light emitting diodes that are positioned along the length of the cross member and oriented to emit light in a direction generally toward the outer housing member.

15. The plant cultivation apparatus of claim 1 wherein each of the plurality of trays includes at least one sidewall attachment projection the at least one attachment projection connected to the inner surface of the outer housing member such that the plurality of drain apertures are each positioned proximate to and above an assocaited plant-receiving aperture.

16. A plant hydration system comprising:
a reservoir configured to contain a fluid therein, the reservoir having a reservoir opening defined by a reservoir edge and defining a central chamber;
a unitary central shaft having a first end, a second end, and a length, the first end of the unitary central shaft terminating in the central chamber of the reservoir;
a plurality of trays positioned in a spaced relationship along the length of the unitary central shaft and projecting radially outward therefrom, the plurality of trays including at least one first tray and at least one second tray wherein the at least one first tray has a first circumferential periphery and the at least one second tray has a second circumferential periphery and wherein the second circumferential periphery is greater than the first circumferential periphery, and wherein the first tray is positioned on the unitary central shaft distal to the reservoir, wherein each of the plurality of trays includes at least one drain aperture located to on the circumferential periphery at a junction defined by a base and a side wall projection upward from the base;
an outer housing member, the outer housing member having a housing member wall and contact edge connected to the housing member wall, the contact edge defining a contact edge opening, wherein the contact edge is configured to contact the reservoir edge, the outer housing member defining a chamber configured to receive the plurality of trays and the unitary central shaft, the housing member wall having at least three rows of plant-receiving apertures defined therein, wherein the plant-receiving apertures are configured to releasably receive and retain a bare-root plant or a seed starting member, wherein the bare root plant or seed starting member comprises a container, the container configured to receive the bare root pant of seed starting member therein, the container having a side wall connected to an upper lip, the side wall projecting into the inner chamber defined by the outer housing, the side wall having a plurality of apertures defined therein;
wherein the plurality of drain apertures in one of the plurality of trays correspond in number to a number of plant receiving apertures defined in the outer housing member located immediately below the associated tray and wherein each respective drain aperture is located above the associated plant receiving aperture; and
a pump mechanism located in the central chamber of the reservoir, wherein the first end of the unitary central shaft is operatively connected to the pump mechanism and wherein the second end of the unitary central shaft is in fluid communication with at least one of the plurality of trays, the pump mechanism configured to convey the fluid from the first end of the unitary central shaft to the second end of the unitary central shaft and into contact with a respective tray proximate to the second end of the unitary central shaft,
wherein the plant hydration system is operable to:
receive, at the plant-receiving apertures, at least one plant root structure,
intermittently pump a plant nutrient solution from the reservoir to a first tray proximate to the second end of the unitary central shaft, the first tray including a plurality of drain apertures positioned proximate to, and substantially above, the plant root structure;
cascade the plant nutrient solution onto the at least one plant root structure or seed starting member through the apertures defined the container removably positioned the plant-receiving aperture defined in the outer housing member, wherein the plant nutrient cascading step includes the plant nutrient solution traveling through the drain apertures and onto a second tray positioned below the first tray; and
reintroducing the plant nutrient solution to the reservoir.

* * * * *